(12) United States Patent
Yasooka et al.

(10) Patent No.: US 6,615,047 B1
(45) Date of Patent: Sep. 2, 2003

(54) RADIO COMMUNICATIONS SYSTEM

(75) Inventors: Kousuke Yasooka, Tokyo (JP);
Yoshiyuki Chatani, Tokyo (JP);
Nobuyuki Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,013

(22) Filed: Apr. 8, 1999

(51) Int. Cl.[7] .................................................. H04Q 7/20
(52) U.S. Cl. ........................ 455/446; 455/447; 455/562
(58) Field of Search ................................. 455/562, 446, 455/447, 450, 451, 452

(56) References Cited

U.S. PATENT DOCUMENTS

| | | | |
|---|---|---|---|
| 4,128,740 A | | 12/1978 | Graziano |
| 5,067,147 A | * | 11/1991 | Lee .............................. 455/436 |
| 5,301,188 A | * | 4/1994 | Kotzin et al. ................. 370/50 |
| 5,574,975 A | * | 11/1996 | Hill ............................. 455/503 |
| 5,734,983 A | * | 3/1998 | Faruque ..................... 455/450 |
| 5,859,841 A | * | 1/1999 | Gitlits ........................ 370/335 |
| 5,924,037 A | * | 7/1999 | Mao ........................... 455/447 |
| 6,289,221 B1 | * | 9/2001 | Ritter |
| 6,405,044 B1 | * | 6/2002 | Smith et al. ................. 455/447 |

FOREIGN PATENT DOCUMENTS

| | | | | |
|---|---|---|---|---|
| JP | 4-502694 | A | 5/1992 | |
| JP | 6-276138 | A | 9/1994 | |
| JP | 7-115422 | | 5/1995 | |
| JP | 7-274243 | | 10/1995 | |
| JP | 9-233536 | | 9/1997 | |
| JP | 10-042352 | * | 2/1998 | ............ H04Q/7/36 |
| JP | 63-070622 | | 3/1998 | |
| JP | 2000-504171 | A | 4/2000 | |
| WO | WO 97/28666 | | 8/1997 | |

OTHER PUBLICATIONS

Merriam–Webster's Collegiate Dictionary, Tenth Edition, Merriam–Webster Incorporated, 1993, p. 14.*

* cited by examiner

*Primary Examiner*—Dwayne Bost
*Assistant Examiner*—Lewis West
(74) *Attorney, Agent, or Firm*—Birch, Stewart, Kolasch & Birch, LLP

(57) ABSTRACT

A cell group is formed from three cells, each of which has a site equipped with antennas. The antennas differ from one another in terms of horizontal orientation and cover all horizontal directions. The cell groups are arranged in a repeating pattern such that a cell having a site assigned different frequency is interposed between cell groups assigned the same frequency, thereby constituting a minimum unit area to be repeated.

20 Claims, 26 Drawing Sheets

RADIO COMMUNICATIONS SYSTEM

BACKGROUND OF THE INVENTION

1. Field of the Invention

The present invention relates to a radio communications system which establishes connection, through a radio channel, between a fixed terminal located at the home of an ordinary subscriber or at a business establishment and an exchange or a basic trunk cable, and which offers communications services such as a telephone service, an information service, a graphic service, and a multimedia service.

2. Description of the Related Art

A conventional dominant cell structure employed in the field of mobile communications such as that found in a radio system is a sector cell configuration, wherein a directional antenna is used for a site formed from a plurality of sector cells (often simply referred to as "sectors"). FIGS. 27 and 28 show an example of the sector cell configuration. In FIG. 27, each site is formed from three sectors. Seven sites comprising a total of 21 sectors are handled as a unit, and frequencies are allocated repeatedly on a per-unit basis (such a configuration will hereinafter be referred to simply as a "frequency repetition every three-sectors/seven-sites"). FIG. 28 shows an example in which each site is formed from six sectors. Seven sites comprising 42 sectors are handled as a unit, and frequencies are allocated repeatedly on a per-unit basis (such a configuration will be hereinafter referred to as a "frequency repetition every six-sectors/seven-sites"). In the drawings, reference numerals 91 to 97 and 98 to 103 designate sites; and 97 and 104 designate service areas, wherein areas allotted the same reference numerals are assigned the same frequency. In FIG. 27, the site 91 receives an interference wave signal of 7.7 dB emitted from fixed terminal stations disposed in the service areas 97 of the sites 92 to 96. In FIG. 28, the site 98 receives an interference wave signal of 10.5 dB emitted from the fixed terminals disposed in the service areas 104 of the sites 99 to 103.

FIG. 29 is a plan view similar to a plan view of sector zones provided in Japanese Patent Application Laid-Open No. Hei-8-193556 entitled "Radio System," showing the relationship between frequencies used among adjacent sites and the layout of beams emanated from antennas. In the drawing, reference numerals 105 to 107 designate service areas of individual antennas, and areas allotted the same reference numeral are assigned the same frequency. Reference numerals 108 and 109 designate sites; and 110 designates a fixed terminal station. In a radio communications system, radio communication is established between a site, such as a subscriber radio system, and a plurality of fixed terminal stations disposed in a cell covered by the site. As can be seen from the cell layout shown in FIG. 29, in each of the plurality of adjacent sites frequencies are assigned to the cells in the same sequence. Further, the centers of the beams emanated at the same frequency from the antennas are offset from one site to another adjacent site by an amount approximately equal to the beam angle.

In a conventional radio communications system, a certain district is divided into a plurality of cells, and a site is disposed at the center of each cell. Radio communication is established between the site and a plurality of fixed terminals disposed in the cell where the site is located. The cells are assigned frequencies in the same sequence, and the centers of beams emanated from the antennas are offset from one site to another adjacent site by an amount approximately equal to the beam angle. As shown in FIG. 29, a fixed terminal 110 receives a radio wave signal from the site 109, in addition to a radio wave signal from the site 108, thus receiving interference wave signals of the same frequency. At this time, a receiving carrier-to-interference (C/I) ratio, which is a ratio of carrier wave signal power to interference wave signal power is 5.2 dB, thus inducing considerable radio interference.

SUMMARY OF THE INVENTION

The present invention has been made to solve the above problems with the prior art, and therefore an object of the present invention is to provide a radio communications system which diminishes the level of radio interference by ensuring a sufficient C/I ratio and required frequencies.

According to a first aspect of the present invention, there is provided a radio communications system which establishes radio communication between arbitrary sites and fixed terminal stations which are directional and disposed in a cell centered on the site, wherein each of the sites is provided with three antennas of equal horizontal beam width and whose orientations are horizontally offset from one another;

at each site, the beams emanated from the individual antennas, as a whole, cover all horizontal directions;

the antennas assigned the same frequency as that of the site are arranged in the same sequence;

a cell group comprises three cells, in which the centers of beams emanated from the antennas assigned the same frequency are offset from one site to another site by an amount approximately equal to the beam width;

the cells are adjacent to one another;

the cell group comprises a plurality of groups of different frequencies and constitutes a minimum unit area to be repeated; and the minimum unit areas are repeatedly arranged in longitudinal and lateral directions.

According to a second aspect of the present invention, there is provided a radio communications system which establishes radio communication between arbitrary sites and fixed terminal stations which are directional and disposed in a cell centered on the site, wherein each of the sites is provided with "n" (where "n" represents a positive integer equal to or greater than 4) sector antennas which are equal in horizontal beam width and whose orientations are horizontally offset from one another;

at each site the beams emanated from the individual antennas, as a whole, cover all horizontal directions;

frequencies are arranged such that sectors within a cell are assigned the same frequency every "m" sectors (where "m" represents a positive integer of equal to or greater than 2, and m<n);

the antennas assigned the same frequency as that of the site are arranged in the same sequence;

a cell group comprises "m" cells, in which the centers of beams emanated from the antennas assigned the same frequency are horizontally offset from one site to another site by an amount approximately equal to the beam width;

the cells are adjacent to one another;

the cell group comprises a plurality of groups of different frequencies and constitutes a minimum unit area to be repeated; and the minimum unit areas are repeatedly arranged in longitudinal and lateral directions.

According to a third aspect of the present invention, there is provided a radio communications system which establishes radio communication between arbitrary sites and fixed terminal stations which are directional and disposed in a cell centered on the site, wherein each of the sites is provided with three antennas which are equal in horizontal beam width and whose orientations are horizontally offset from one another;

at each site, the beams emanated from the individual antennas, as a whole, cover all horizontal directions;

the antennas assigned the same frequency as that of the site are arranged in the same sequence;

a cell group comprises three cells, in which the centers of beams emanated from the antennas assigned the same frequency are offset from one site to another site by an amount approximately equal to the beam width;

the cells are arranged such that a cell having an antenna assigned different frequency is interposed between adjacent cells;

the cell group comprises a plurality of groups of cells assigned different frequencies and constitutes a minimum unit area to be repeated; and the minimum unit areas are repeatedly arranged in longitudinal and Lateral directions.

According to a fourth aspect of the present invention, there is provided a radio communications system which establishes radio communication between arbitrary sites and fixed terminal stations which are directional and disposed in a cell centered on each site, wherein each of the sites is provided with "n" (where "n" represents a positive integer equal to or greater than 4) sector antennas which are equal in horizontal beam width and whose orientations are horizontally offset from one another;

the beams emanated from the individual antennas, as a whole, cover all horizontal directions;

frequencies are arranged such that sectors within a cell are assigned the same frequency every "m" sectors (where "m" represents a positive integer of equal to or greater than 2, and m<n);

the antennas assigned the same frequency as that of the site are arranged in the same sequence;

a cell group comprises "m" cells, in which the centers of beams emanated from the antennas assigned the same frequency are offset from one site to another site by an amount approximately equal to the beam width;

the cells are arranged such that "L" (where "L" designates 0 or a positive integer greater than 1) cells having an antenna assigned a different frequency is interposed between the adjacent cells;

the cell group comprises a plurality of groups of different frequencies and constitutes a minimum unit area to be repeated; and the minimum unit areas are repeatedly arranged in longitudinal and lateral directions.

According to a fifth aspect of the present invention, the radio communications system as defined in any one of the first through fourth aspects is further characterized by that the minimum unit areas are repeatedly arranged in the vertical direction so as to become horizontally offset from one another.

According to a sixth aspect of the present invention, the radio communications system as defined in any one of the first through fourth aspects is further characterized by that the minimum unit areas are repeatedly arranged such that a column of minimum unit areas becomes vertically offset from another column of minimum unit areas.

DETAILED DESCRIPTION OF THE PREFERRED EMBODIMENTS

Now, a description will be given in more detail of preferred embodiments of the invention with reference to the accompanying drawings.

First Embodiment

Figure 1:
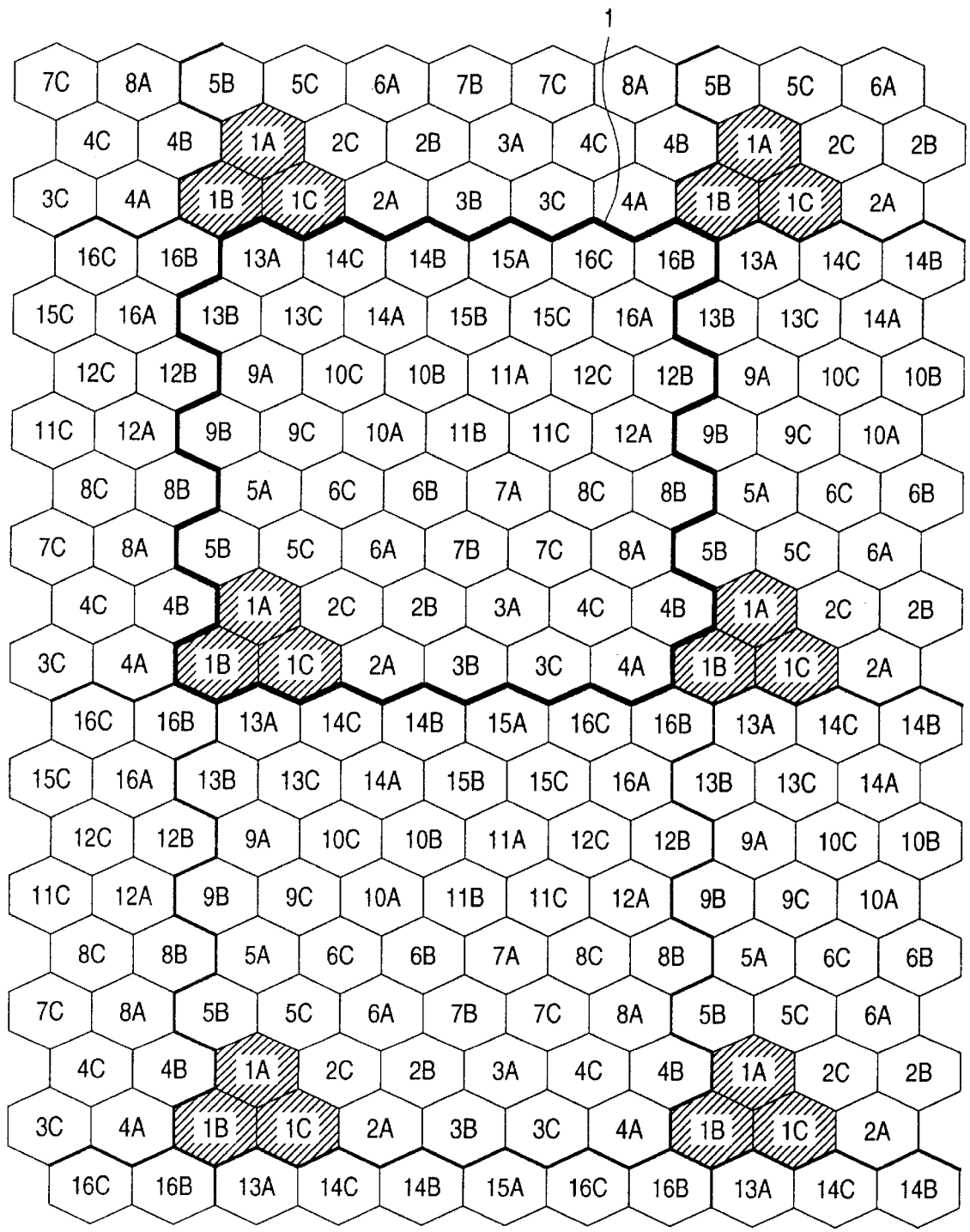
FIG. 1 is a plan view showing the minimum unit areas to be repeated according to a first embodiment of the present invention.
Figure 2:
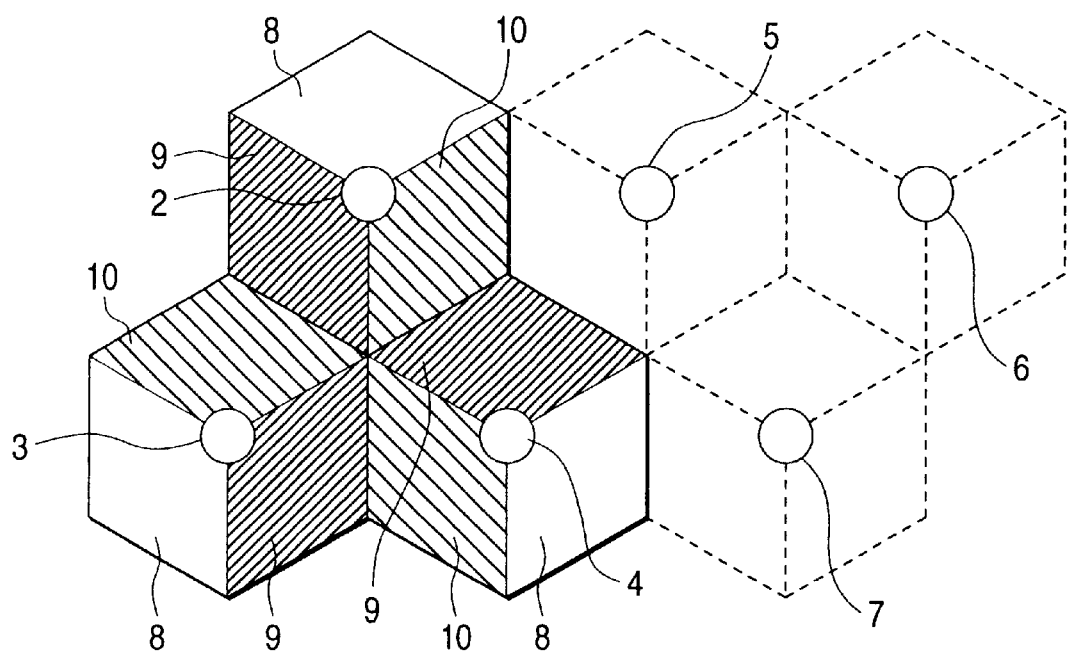
FIG. 2 is a plan view showing a relationship among antennas of sites in a radio communications system according to the first embodiment.

FIG. 1 shows the minimum area to be repeated in a cell configuration shown in FIG. 2, wherein cell groups having sixteen different frequencies are arranged in a repeating pattern. In the drawings, reference numerals 1A to 1C, 2A to 2C, . . . ; and 16A to 16C designate cells, and reference numeral 1 designates the minimum unit area to be repeated. Reference numerals 1A to 1C designate cells that constitute the cell group shown in FIG. 2 and are assigned a set of frequencies. Reference numerals 1A to 1C, 2A to 2C, . . . ; and 16A to 16C shown in FIG. 1 are arranged the same as the cells shown in FIG. 2. The cells 1A to 1C are assigned a set of frequencies; the cells 2A to 2C are assigned another set of frequencies; . . . ; and the cells 16A to 16C are also assigned still another set of frequencies. The group of cells 1A to 1C, the group of cells 2A to 2C, . . . , and the group of cells 16A to 16C differ from one another in frequency. The cells 1A to 1C shown in FIG. 1 are the same in configuration as the cells shown in FIG. 2 and are assigned a set of frequencies. In these cells 1A to 1C, antennas are arranged in the same sequence, and the orientations of the antennas provided at the sites are horizontally offset from one site to another site by 120 degrees. The group of cells 1A to 1C, the group of cells 2A to 2C, . . . , and the group of cells 16A to 16C differ in frequency from one another. The cells constitute the minimum unit area to be repeated in such a way as to diminish interference among the frequencies by means of directionality of the antennas disposed at the site or the fixed terminal stations.

FIG. 2 shows one of cell groups constituting the unit area to be repeated shown in FIG. 1. The cell group has three sites, and each of the sites is equipped with three antennas of different frequencies. The three cells are assigned one set of frequencies and are adjacent to one another. Each of the sites is assigned three frequencies in the same sequence, and the centers of beams emanated from the antennas assigned the same frequency are horizontally offset from one another by 120 degrees. In the drawing, reference numerals 2 to 7 designate sites, and reference numerals 8 to 10 designate service areas of the antennas having different frequencies.

Figure 3:
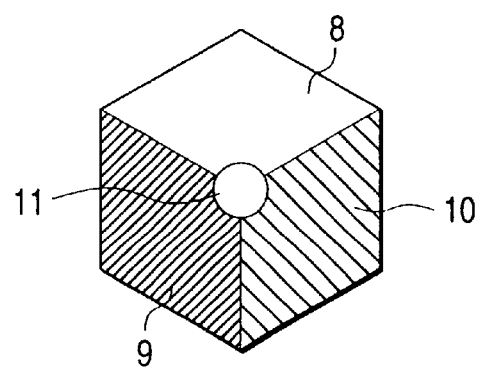
FIG. 3 is a plan view showing frequencies assigned to three antennas and service areas thereof according to the present invention.

FIG. 3 is a plan view showing one of the cells constituting the cell group shown in FIG. 2, wherein the site has three antennas having different frequencies and corresponding service areas. In the drawing, reference numeral 11 designates a site. Since the three antennas are assigned different frequencies, there is no interference among antennas at the same frequency within the same site.

Figure 4:
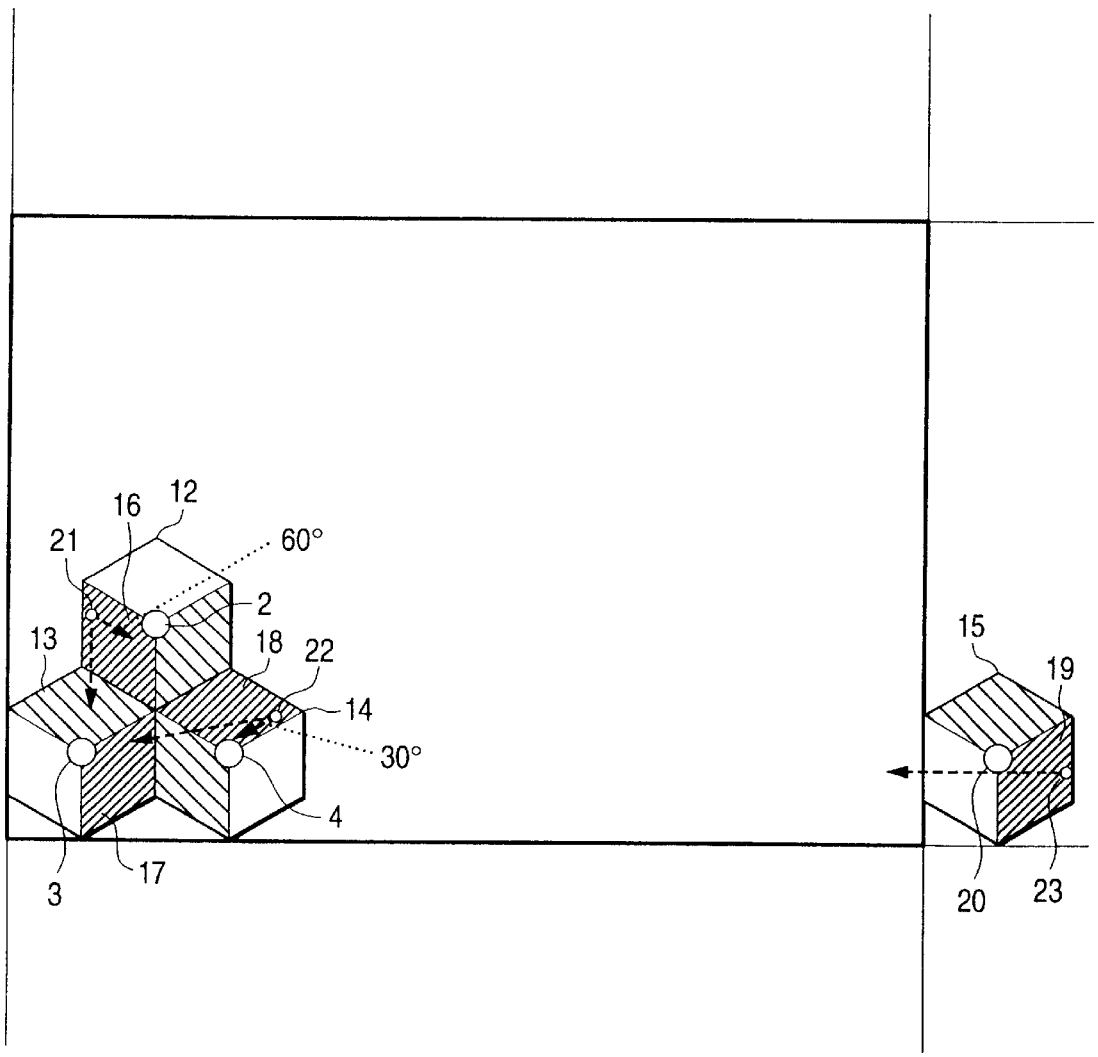
FIG. 4 is a plan view showing interference among radio wave signals according to the first embodiment.
Figure 25:
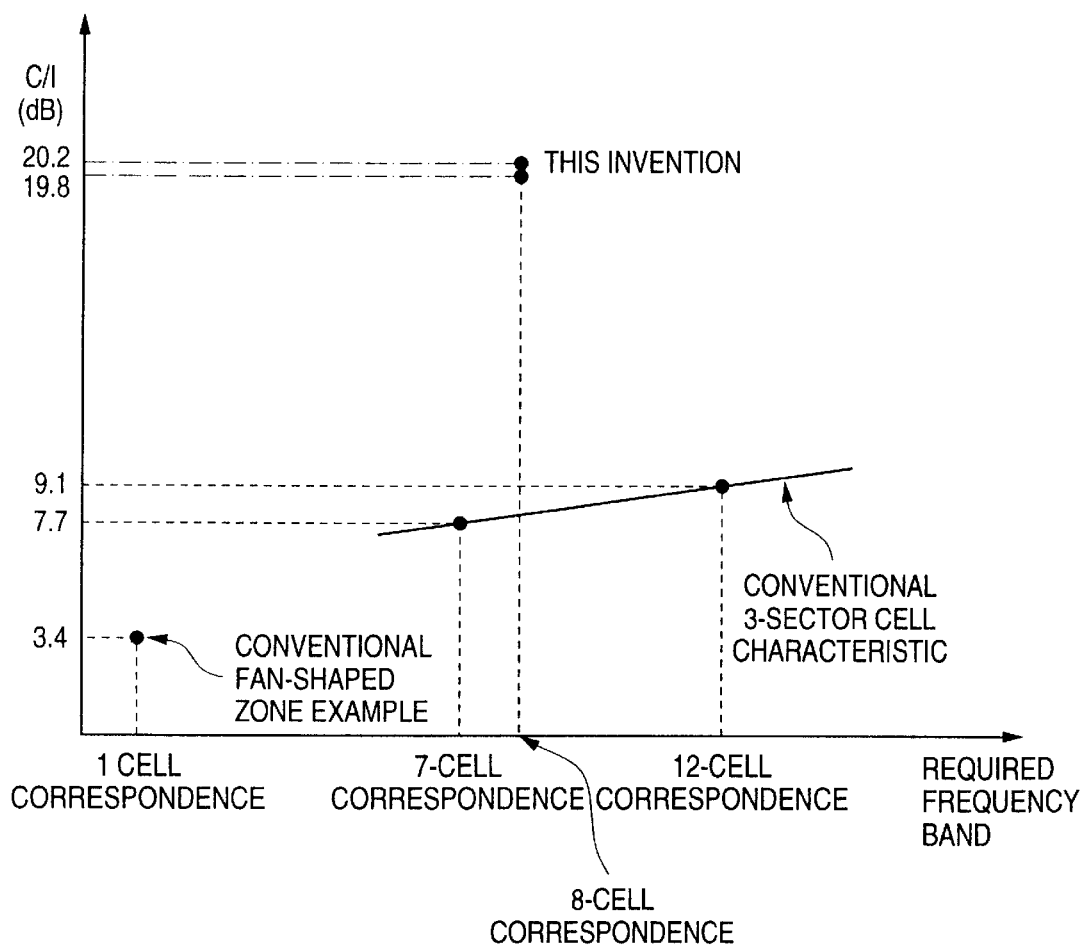
FIG. 25 is a graph showing a receiving C/I ratio in frequency bands required by a three-sectors cell configuration.
Figure 27:
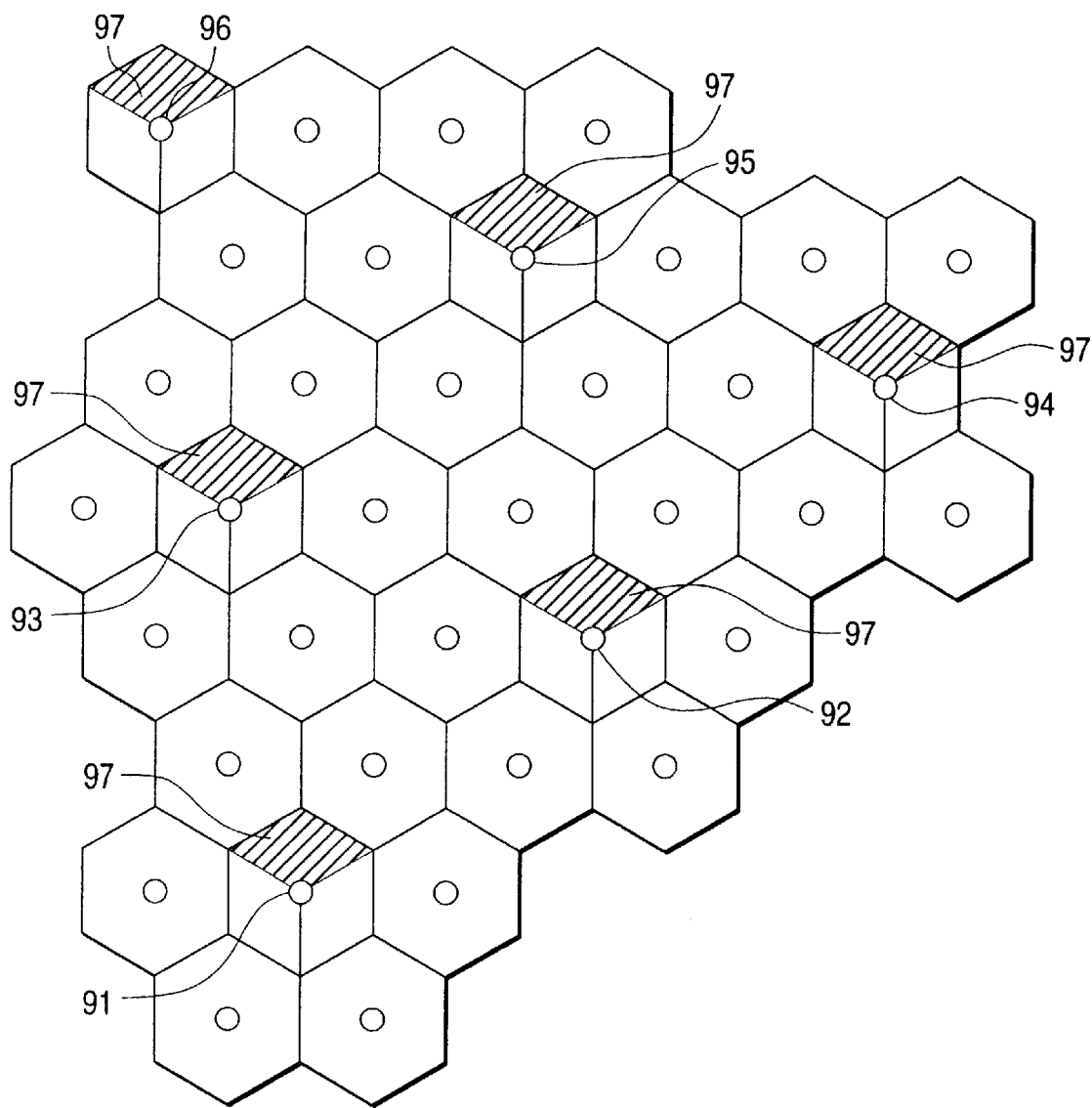
FIG. 27 is a plan view showing a frequency repetition every three-sectors/seven sites which is a dominant cell structure in the field of conventional radio communications systems.
Figure 28:
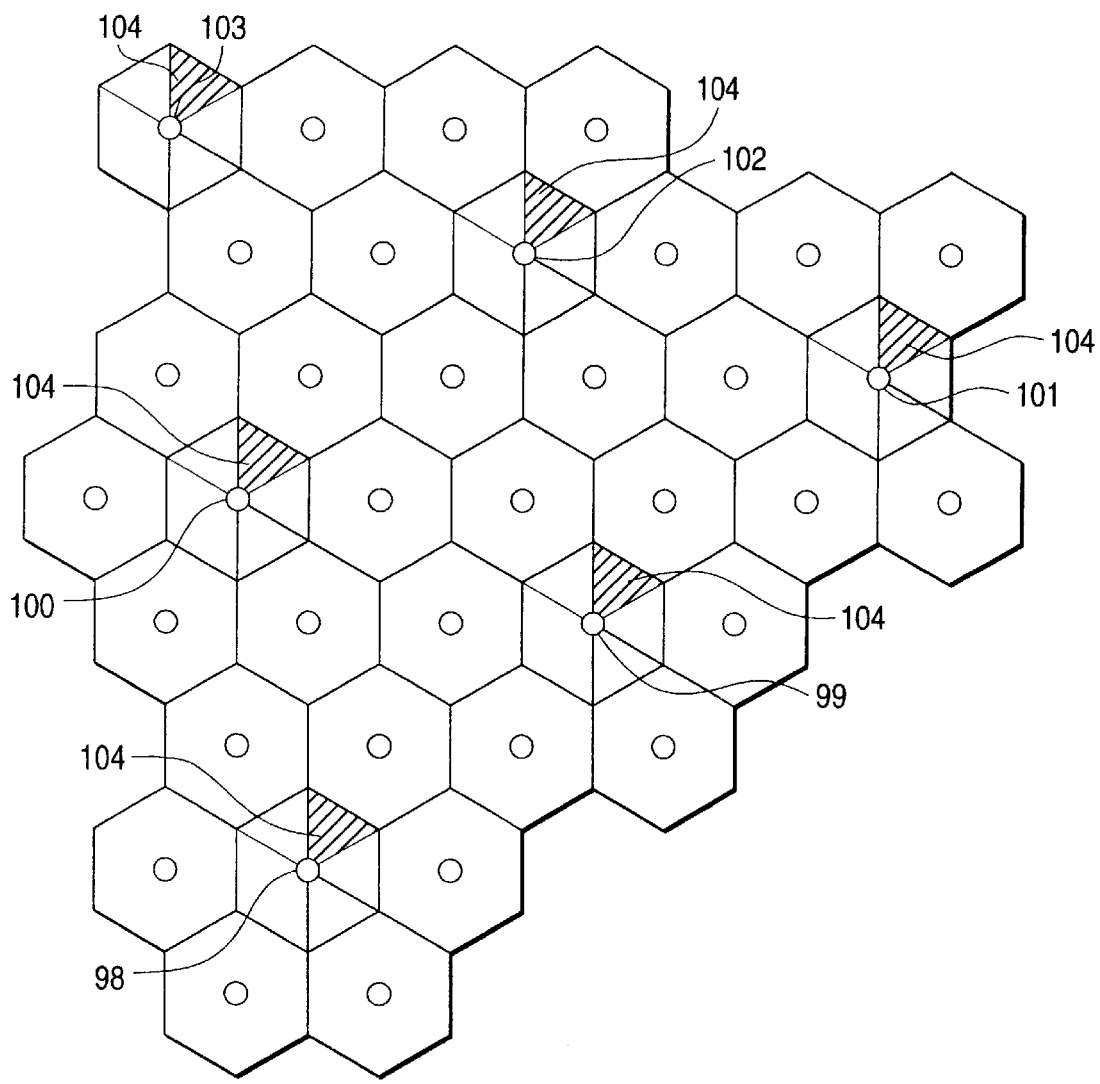
FIG. 28 is a plan view showing a frequency repetition every six-sectors/seven sites which is a dominant cell structure in the field of conventional radio communications systems.
Figure 29:
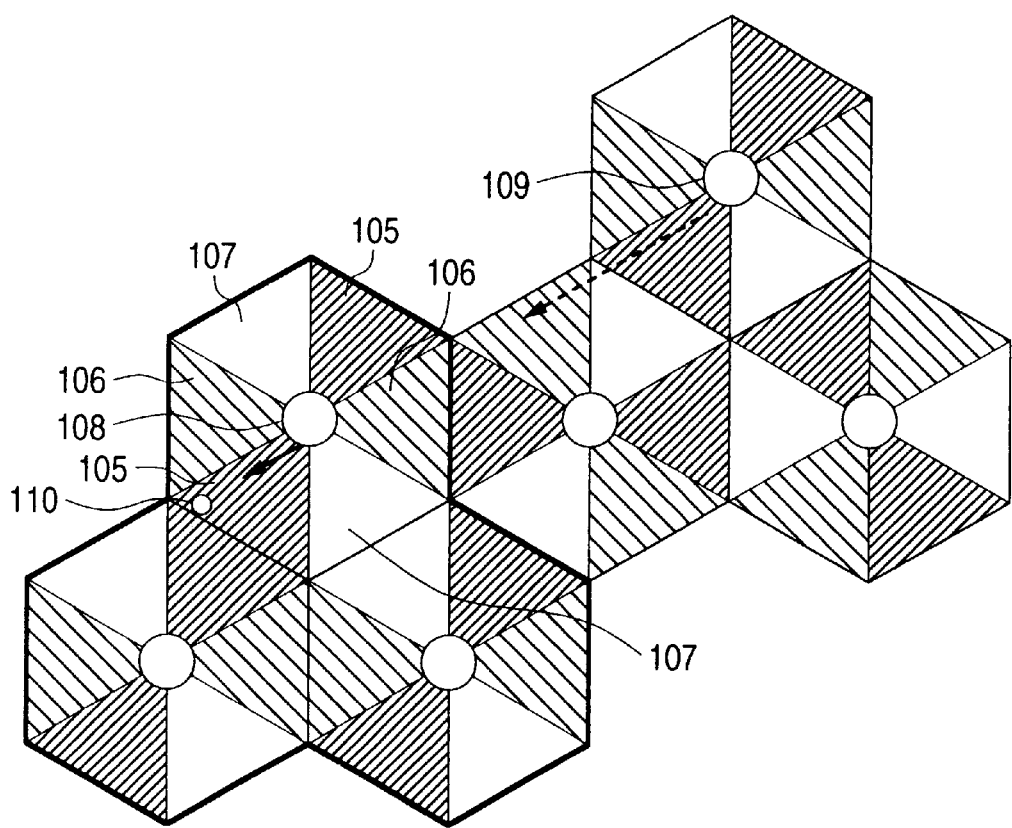
FIG. 29 is a plan view showing a relationship between frequencies assigned to conventional adjacent sites and beams emanated from antennas of the sites.

FIG. 4 is a schematic representation, wherein attention is directed solely to a cell group including the cells 1A to 1C within the minimum area to be repeated shown in FIG. 1. FIG. 4 shows interference between the site within the cells and fixed terminals within the service areas. In the drawing, reference numerals 12 to 15 designate cells; 16 to 19 designate service areas assigned the same frequency; 20 designates a site; 21 designates a fixed terminal station disposed in the area 16 within the cell 12; 22 designates a fixed terminal station disposed in the area 18 within the cell 14; and 23 designates a fixed terminal station disposed in the area 19 within the cell 15. The areas 16, 18, and 19 are assigned the same frequency. The site 3 disposed in the cell 13 receives interference wave signals from a fixed terminal station 21 located in the cell 12, a fixed terminal station 22 located in the cell 14, and a fixed terminal station 23 located in the cell 15. The C/I ratio of the interference wave signal received from the fixed terminal station 21 is considered to be significantly diminished by means of the directionality of the antenna of the site 3. Provided that an attenuation in the interference wave signal from the fixed terminal station 22 caused by the directionality of the antenna of the site 3 is 25 dB, a transmission loss inversely proportional to the square of a distance between the site 3 and the fixed terminal station 22 is 4.8 dB. Therefore, the C/I ratio of the interference wave signal received from the fixed terminal station 22 is 29.8 dB (i.e., the sum of 25 dB and 4.8 dB). An attenuation in the interference wave signal from the fixed terminal station 23 caused by the directionality of the antenna of the site 3 is 0 dB, and a transmission loss inversely proportional to the square of the distance between the site 3 and the fixed terminal station 23 is 20.3 dB. Therefore, the C/I ratio of the interference wave signal received from the fixed terminal station 23 is 20.3 dB (i.e., the sum of 0 dB and 20.3 dB). The total C/I ratio of the interference wave signals received by the site 3 is 19.8 dB. In contrast, the C/I ratio of the interference wave signal received by the site from the fixed terminal stations in the conventional cell configuration shown in FIG. 29 assumes a value of 9.5 dB. The conventional cell configurations shown in FIGS. 27 and 28 require frequencies corresponding to the traffic of seven cells. As shown in FIG. 25, the conventional cell configurations can ensure only the C/I ratios of 7.7 dB and 9.1 dB. In contrast, the frequencies assigned to the cell configuration shown in FIG. 1 correspond to traffic of eight cells of a conventional cell configuration. Accordingly, as shown in FIG. 25, the radio system according to the present invention prevents interference among the sites or fixed terminal stations, which would otherwise be caused by an interference wave signal, while using frequencies substantially equal in number to those used in the conventional radio system, thereby enabling effective utilization of frequencies.

Second Embodiment

Figure 5:
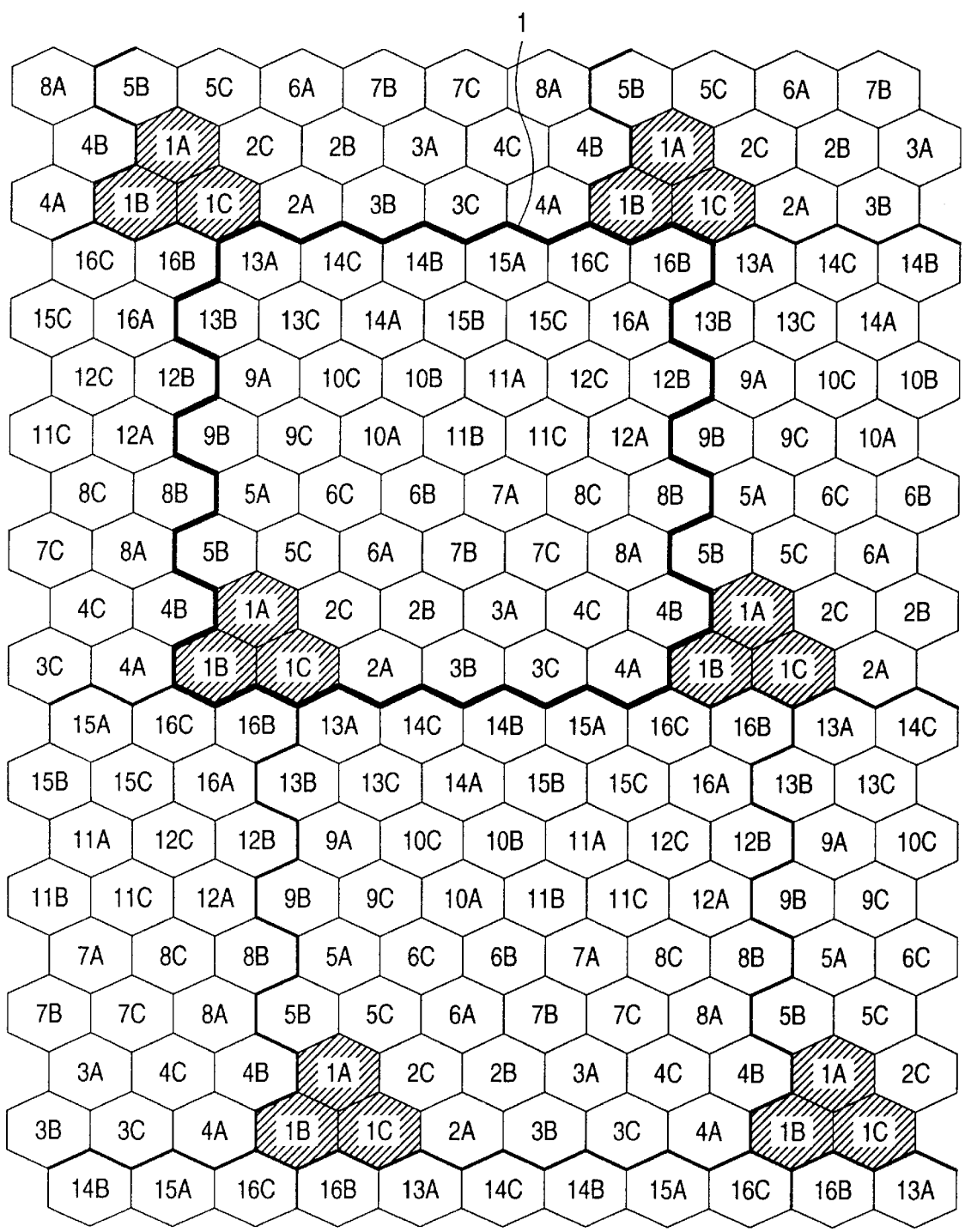
FIG. 5 is a plan view showing the minimum unit areas to be repeated according to a second embodiment of the present invention.

FIG. 5 is a plan view showing a cell configuration according to a second embodiment of the present invention. In the drawing, reference numerals 1A to 1C designate cells that constitute the cell group shown in FIG. 2 and are assigned a set of frequencies. Reference numeral 1 designates a minimum unit area to be repeated. In the drawing, the cells 1A to 1C are the same as the cells shown in FIG. 2 and are assigned a set of frequencies. The group of cells 1A to 1C, the group of cells 2A to 2C, ..., and the group of cells 16A to 16C differ from on e another in frequency. FIG. 5 is similar to FIG. 1, showing the layout of minimum unit areas to be repeated. The difference between the drawings is that in FIG. 5 the minimum unit areas are repeatedly arranged in the vertical direction so as to become horizontally offset from one another.

Third Embodiment

Figure 6:
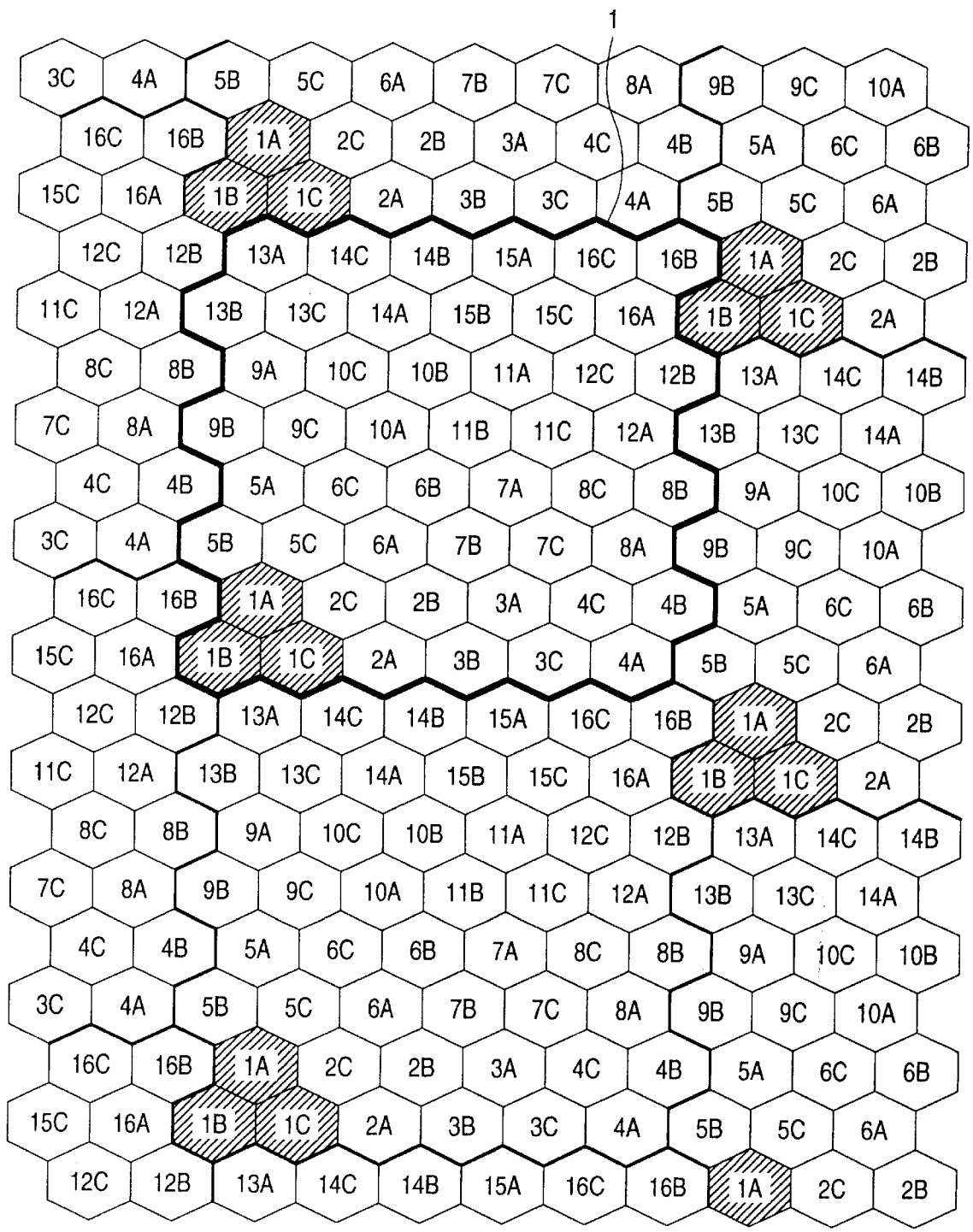
FIG. 6 is a plan view showing the minimum unit areas to be repeated according to a third embodiment of the present invention.

FIG. 6 is a plan view showing a cell configuration according to a third embodiment of the present invention. In the drawing, the cells 1A to 1C are the same as the cells shown in FIG. 2 and are assigned a set of frequencies. The group of cells 1A to 1C, the group of cells 2A to 2C, ..., and the group of cells 16A to 16C differ from one another in frequency. FIG. 6 is similar to FIG. 1, showing the layout of minimum unit areas to be repeated. The difference between the drawings is that in FIG. 6 the minimum unit areas are repeatedly arranged such that a column of minimum unit areas becomes vertically offset from another column of minimum unit areas.

Fourth Embodiment

Figure 7:
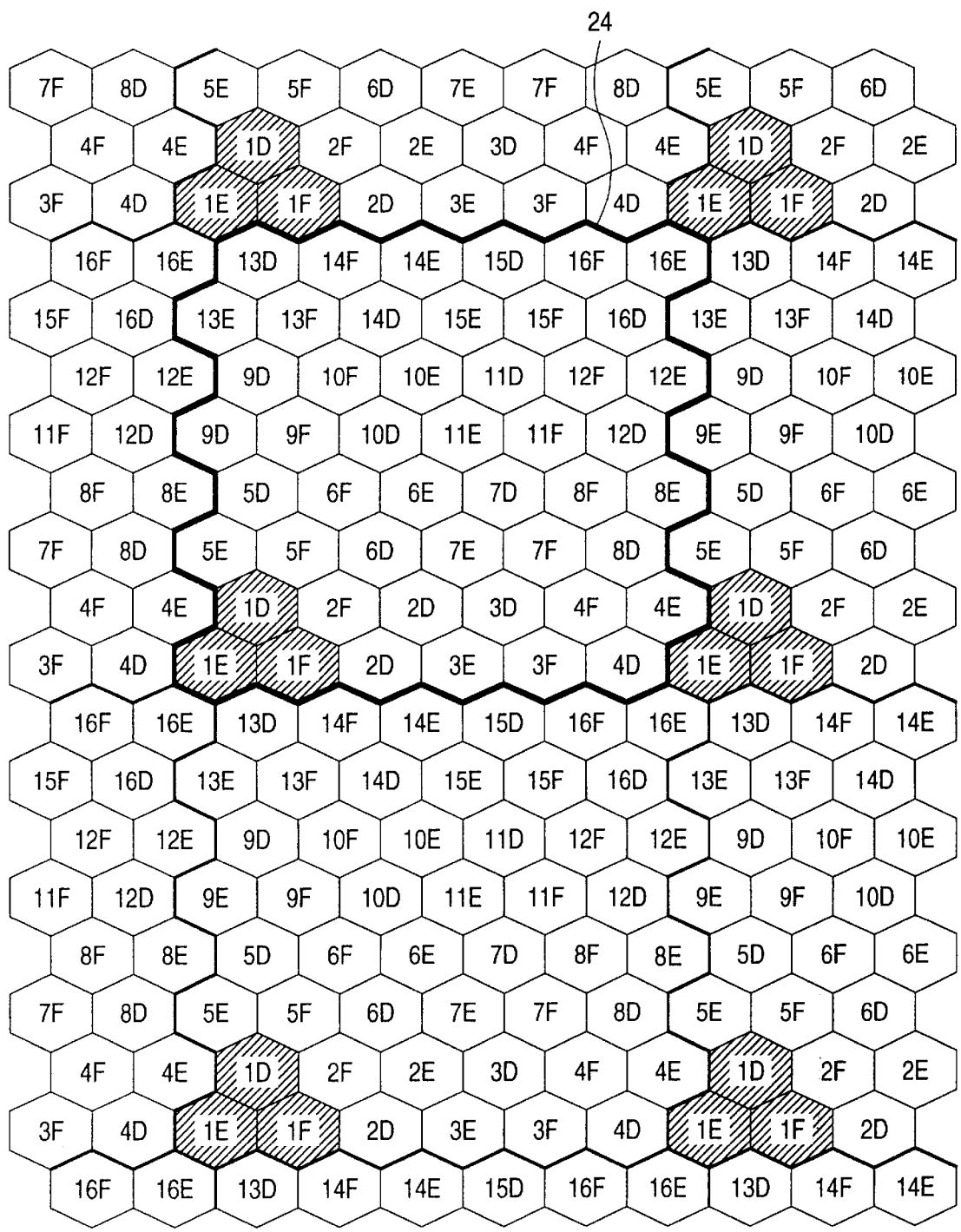
FIG. 7 is a plan view showing the minimum unit areas to be repeated according to a fourth embodiment of the present invention.
Figure 8:
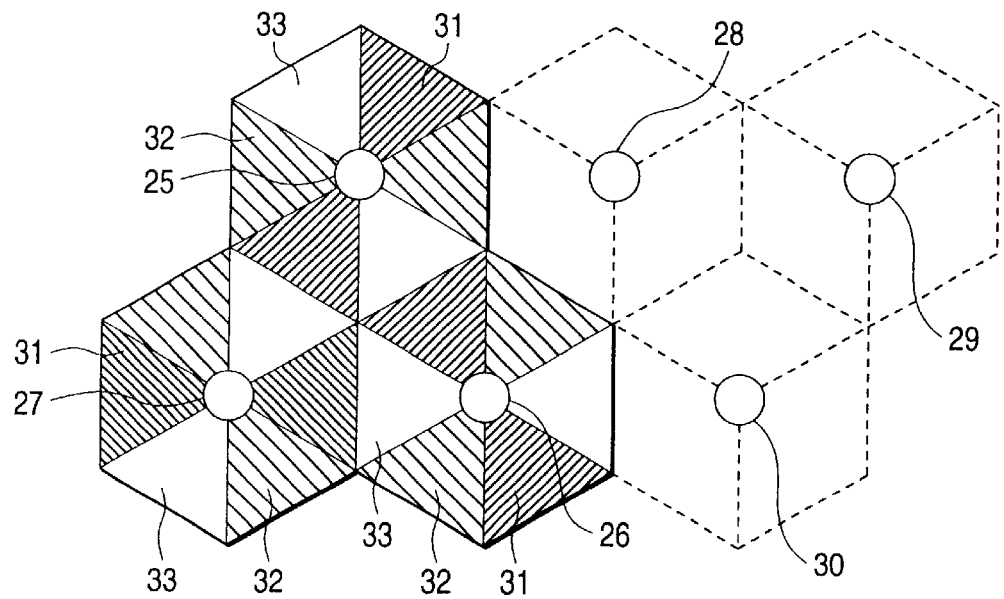
FIG. 8 is a plan view showing a relationship among antennas of sites in a radio communications system according to the fourth embodiment.

FIG. 7 shows the minimum area to be repeated in a cell configuration shown in FIG. 8, wherein cell groups having sixteen different frequencies are arranged in a repeating pattern. Reference numerals 1D to 1F designate cells that constitute the cell group shown in FIG. 8 and are assigned a set of frequencies. Reference numeral 24 designates a minimum repeated area. In the drawings, each of the cells 1D to 1F shown in FIG. 8 is equal in structure to the cell shown in FIG. 9 and is assigned a set of frequencies. The group of cells 1D to 1F, the group of cells 2D to 2F, ..., and the group of cells 16D to 16F differ from one another in frequency. In the drawings, the cells 1D to 1F are equal in structure to the cells shown in FIG. 8 and are assigned a set of frequencies. Each of the cells is assigned a set of frequencies in the same sequence. The beams emanated from antennas of the sites are horizontally offset from one site to another site by 60 degrees. The group of cells 1D to 1F, the group of cells 2D to 2F, ..., and the group of cells 16D to 16F differ from one another infrequency, thereby constituting the minimum unit area to be repeated while diminishing interference among the cells within the unit area.

FIG. 8 shows one of the cells constituting the cell group shown in FIG. 7, wherein three cells, which are assigned a set of frequencies and are identical to one another in terms of antenna layout, are adjacent to one another. Further, each of the three sites is assigned the frequencies in the same sequence. The centers of beams emanated from the antennas assigned the same frequency are set so as to become offset from one another by 60 degrees. In the drawing, reference numerals 25 to 30 designate sites; and 31 to 33 designate service areas of individual antennas, wherein areas allotted the same frequency numeral are assigned the same frequency.

Figure 9:
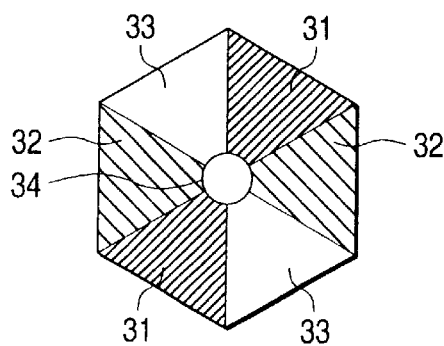
FIG. 9 is a plan view showing frequencies assigned to a plurality of antennas of a site and service areas thereof according to the present invention.
Figure 10:
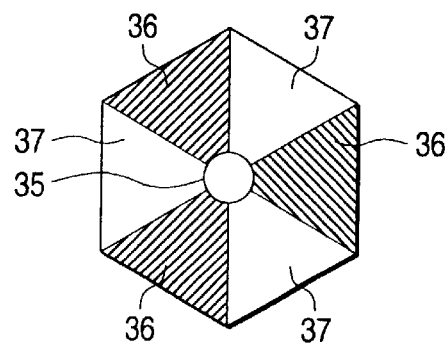
FIG. 10 is a plan view showing frequencies assigned to a plurality of antennas of a site and service areas thereof according to the present invention.

FIGS. 9 and 10 are plan views each showing one example of one of the cells that constitute the cell group shown in FIG. 8, as well as showing frequencies and service areas of a plurality of antennas disposed in the site. In the drawings, reference numerals 34 and 35 designate sites; and 36 and 37 designate service areas of individual antennas, wherein service areas allotted the same reference numeral are assigned the same frequency. As shown in FIGS. 9 and 10, in the fourth embodiment, one site is equipped with a plurality of antennas assigned the same frequency. In he cell shown in FIG. 9, two antennas assigned the frequency of the area 31, two antennas assigned the frequency of the area 32, and two antennas assigned the frequency of the area 33 are arranged in a repeating pattern. In the cell shown in FIG. 10, three antennas assigned the frequency of the area 36 and three antennas assigned the frequency of the area 37 are arranged alternately. More specifically, antennas of two adjacent frequencies are arranged alternately, thereby diminishing interference between the antennas assigned the same frequency within the same site.

Figure 11:
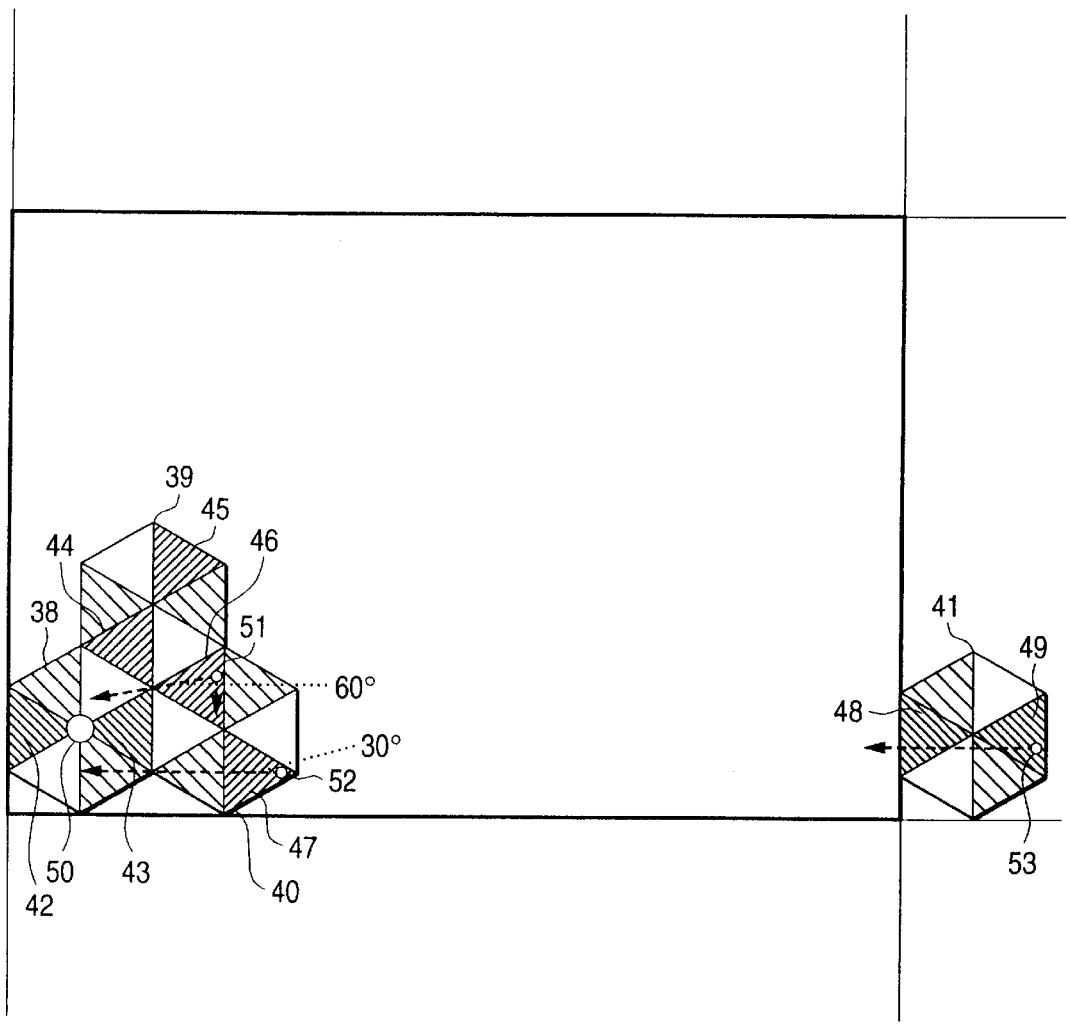
FIG. 11 is a plan view showing interference among radio wave signals according to the fourth embodiment.
Figure 24:
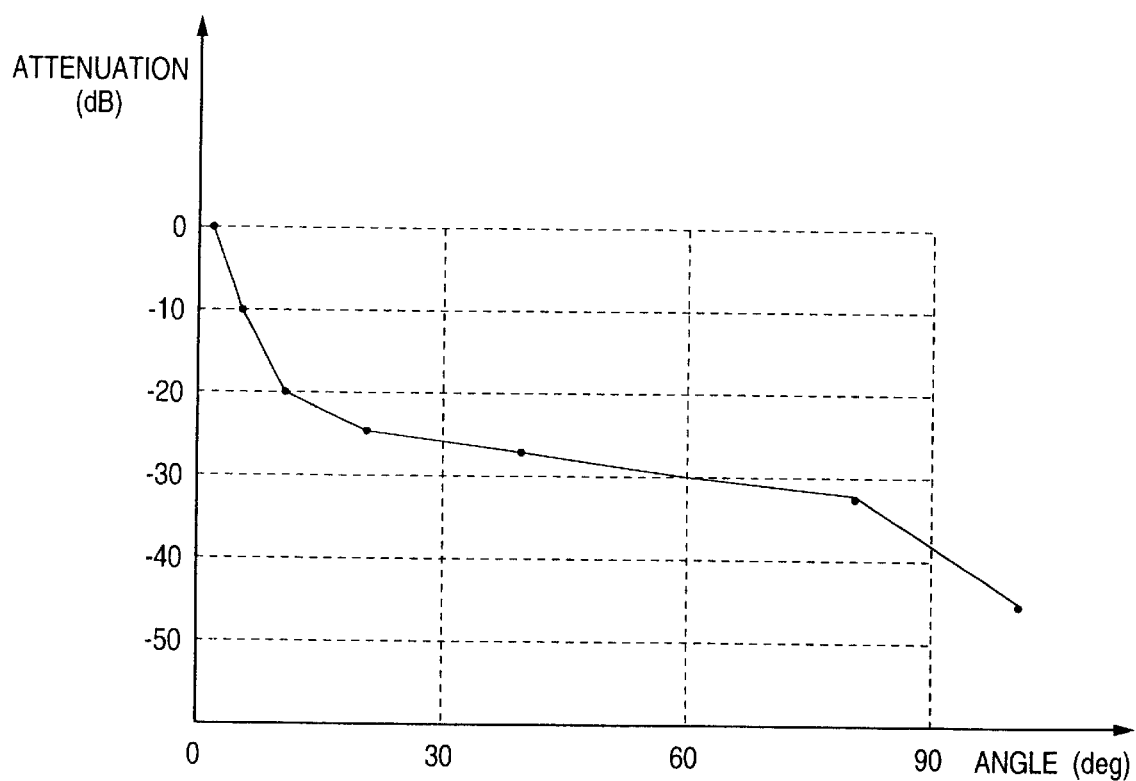
FIG. 24 is a graph showing one example of a receiving pattern (0.3mØ) of an antenna of the fixed terminal station.
Figure 26:
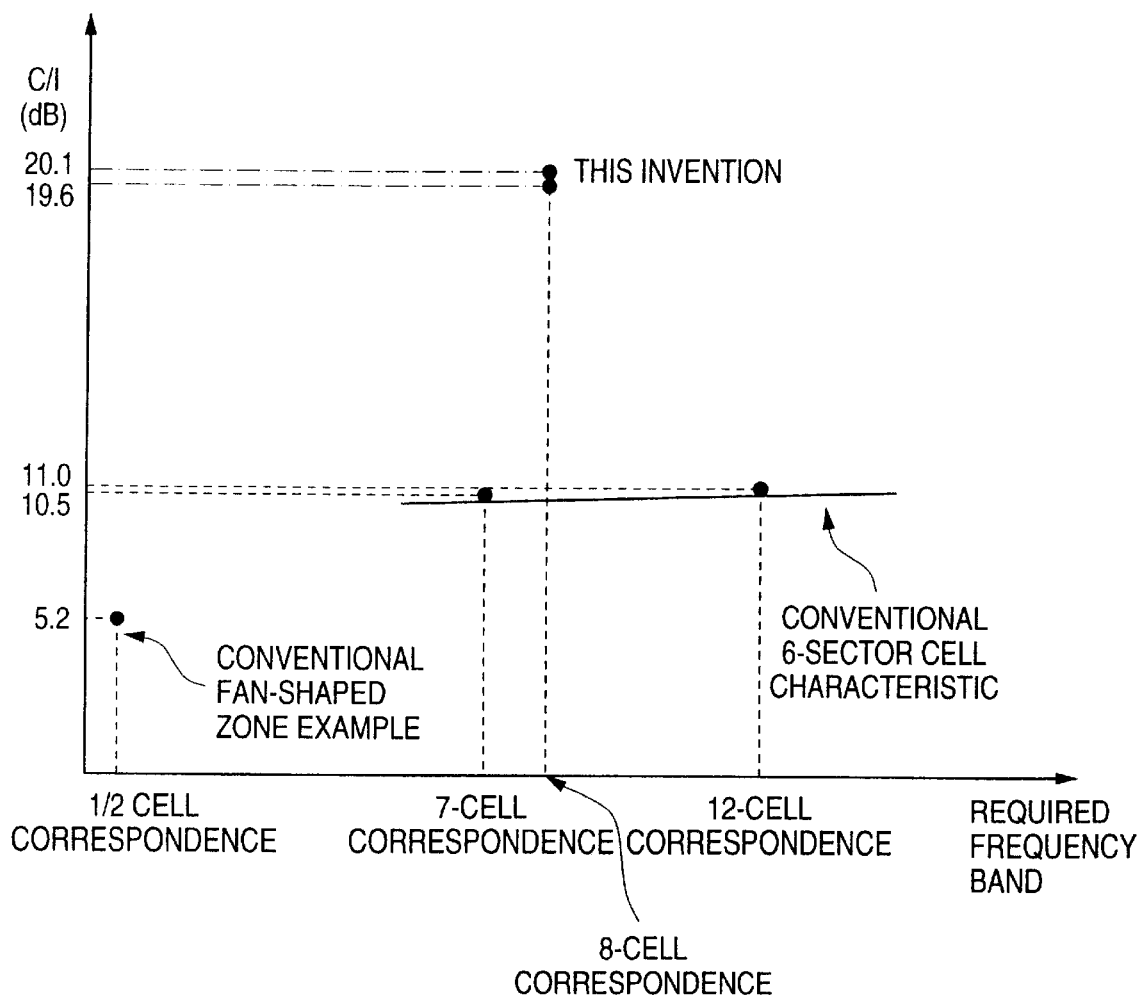
FIG. 26 is a graph showing a receiving C/I ratio in frequency bands required by a six-sectors cell configuration.

FIG. 11 is a schematic representation, wherein attention is directed solely to a cell group including the cells 1D to 1F within the minimum area to be repeated shown in FIG. 7. FIG. 11 shows interference between a site and fixed terminals within the service areas. In the drawing, reference numerals 38 to 41 designate cells; 42 to 49 designate service areas assigned the same frequency; 50 designates a site; 51 designates a fixed terminal station disposed at the area 46 within the cell 40; 52 designates a fixed terminal station disposed in the area 47 within the cell 40; and 53 designates a fixed terminal station disposed in the area 49 within the cell 41. The areas 46, 47, and 49 are assigned the same frequency. The site 50 disposed in the cell 42 receives interference wave signals from a fixed terminal station 51 located in the cell 40, a fixed terminal station 52 located In the cell 40, and a fixed terminal station 53 located in the cell 41. FIG. 24 shows one example of an antenna pattern of the fixed terminal station, and the C/I ratio of each of the interference wave signals is considered to be the same as that mentioned previously. Provided that an attenuation in the interference wave signal from the fixed terminal station 51 caused by the directionality of the antenna of the site 50 is taken as 27 dB from FIG. 24, a transmission loss inversely proportional to the square of the distance between the site 50 and the fixed terminal station 51 is 6.0 dB. Therefore, the C/I ratio of the interference wave signal received from the fixed terminal station 51 is 33.0 dB (i.e., a sum of 27 dB and 6.0 dB). Similarly, the C/I ratio of the interference wave signal from the fixed terminal station 52 is 29.8 dB, and the C/I ratio of the interference wave signal from the fixed terminal station 53 is 20.3 dB. An overall C/I ratio of the interference wave signals received by the site 50 is 19.6 dB. In contrast, the C/I ratio of the interference wave signal received by the fixed terminal from the sites in the conventional cell configuration shown in FIG. 29 assumes a value of 9.5 dB. The conventional cell configurations shown in FIGS. 27 and 28 require frequencies corresponding to traffic of seven cells. As shown in FIG. 26, the conventional cell configurations can ensure only C/I ratios of 10.5 dB and 11.0 dB. In contrast, the frequencies assigned to the cell configuration shown in FIG. 7 correspond to traffic of eight cells of a conventional cell configuration. Accordingly, as shown in FIG. 26, the radio system according to the present invention prevents the site and fixed terminal station from experiencing interference, which would otherwise be caused by an interference wave signal, while using frequencies substantially equal in number to those used in the conventional radio system, thereby enabling effective utilization of frequencies.

Fifth Embodiment

Figure 12:
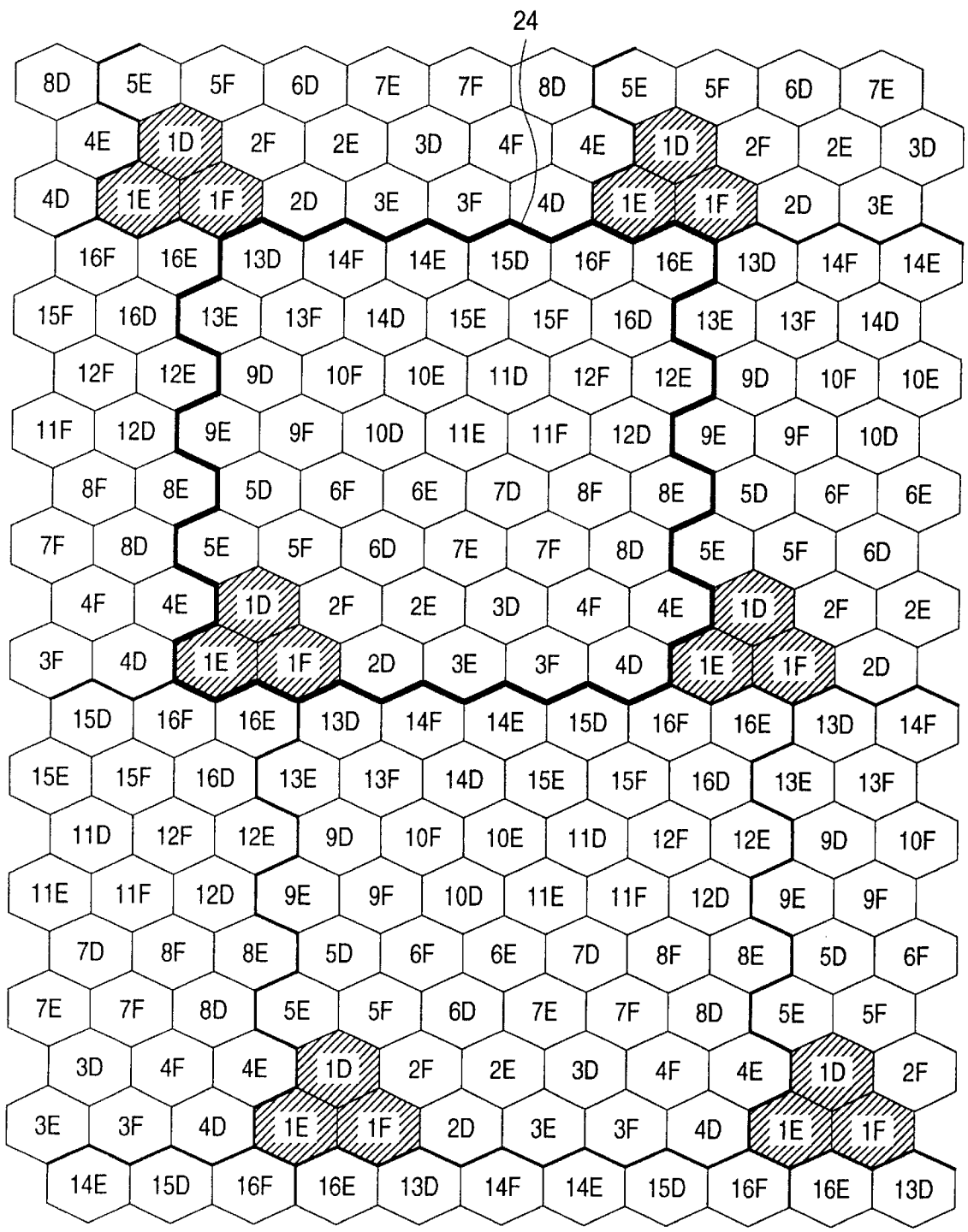
FIG. 12 is a plan view showing the minimum unit areas to be repeated according to a fifth embodiment of the present invention.

FIG. 12 is a plan view showing a cell configuration according to a fifth embodiment of the present invention. In the drawing, reference numerals 1D to 1F designate cells that constitute the cell group shown in FIG. 8 and are assigned a set of frequencies. Reference numeral 24 designates a minimum unit area to be repeated. In the drawing, the cells 1D to 1F are the same as the cells shown in FIG. 8 and assigned a set of frequencies. The group of cells 1D to 1F, the group of cells 2D to 2F, . . . , and the group of cells 16D to 16F differ from one another in frequency. FIG. 12 is similar to FIG. 7, showing the layout of minimum unit areas to be repeated. The difference between the drawings is that in FIG. 12 the minimum unit areas are repeatedly arranged in the vertical direction so as to become horizontally offset from one another.

Sixth Embodiment

Figure 13:
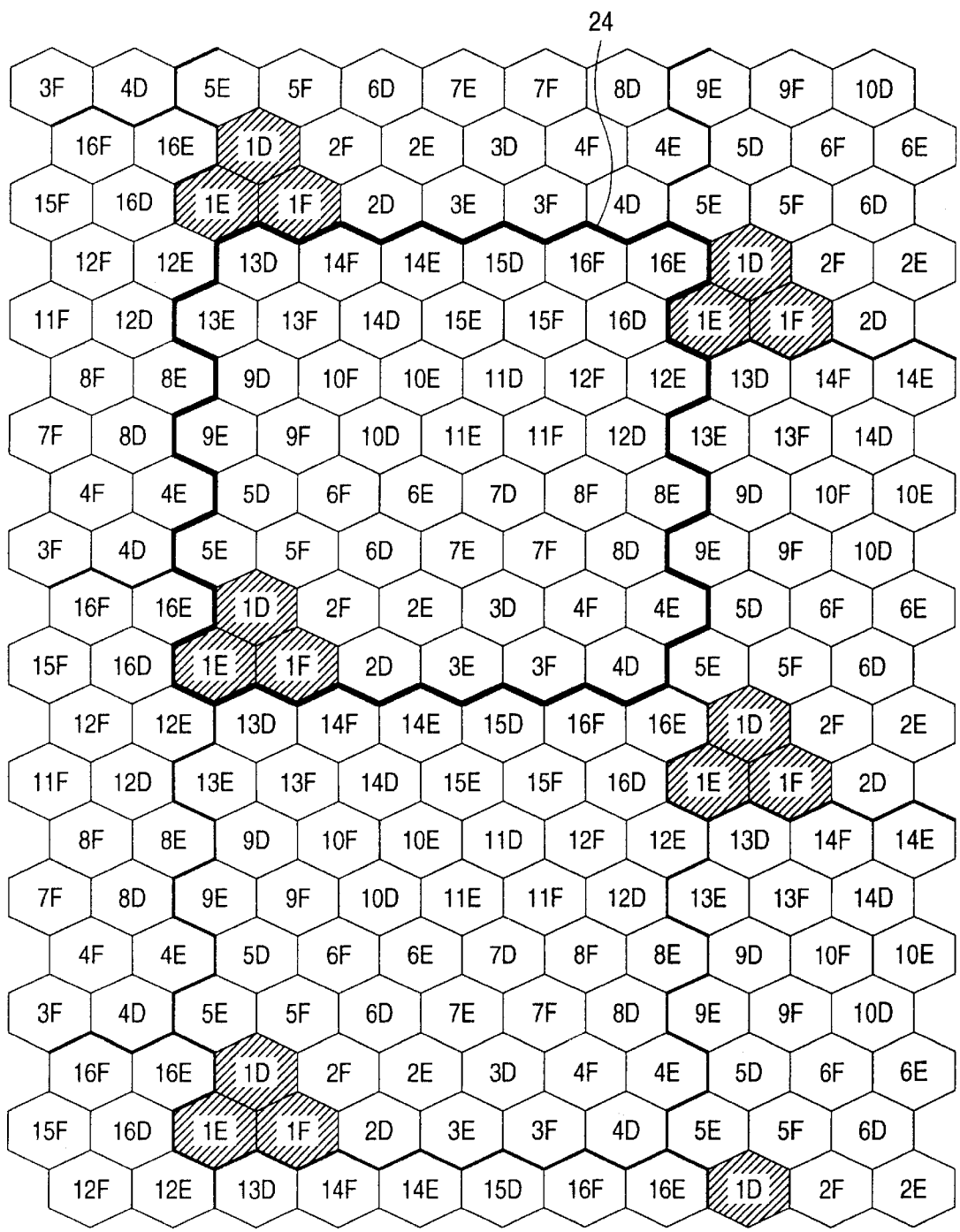
FIG. 13 is a plan view showing the minimum unit areas to be repeated according to a sixth embodiment of the present invention.

FIG. 13 is a plan view showing a cell configuration according to a sixth embodiment of the present invention. FIG. 13 is similar to FIG. 7, showing the layout of minimum unit areas to be repeated. The difference between the drawings is that in FIG. 13 the minimum unit areas are repeatedly arranged such that a column of minimum unit areas becomes vertically offset from another column of minimum unit areas.

Seventh Embodiment

Figure 14:
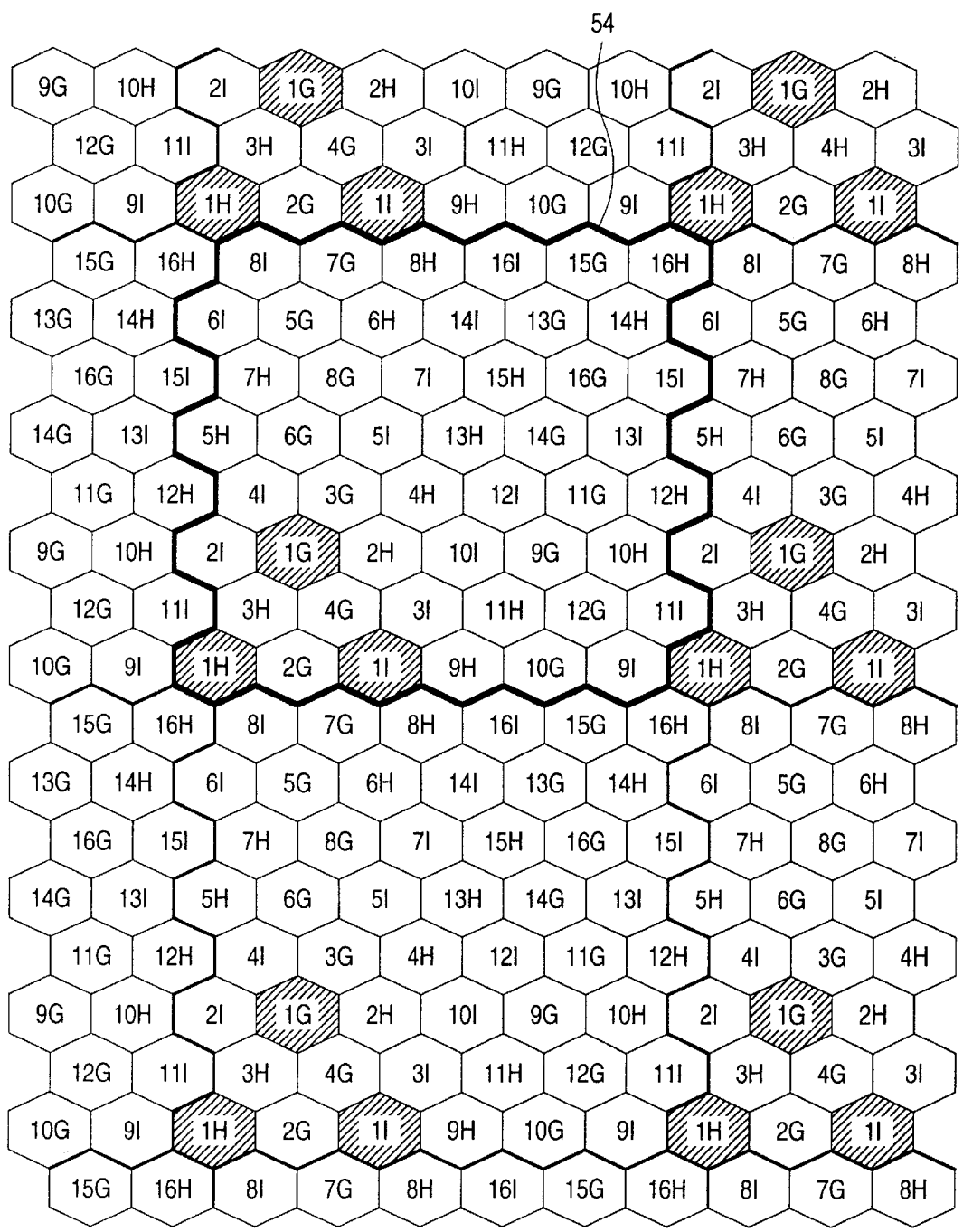
FIG. 14 is a plan view showing the minimum unit areas to be repeated according to a seventh embodiment of the present invention.
Figure 15:
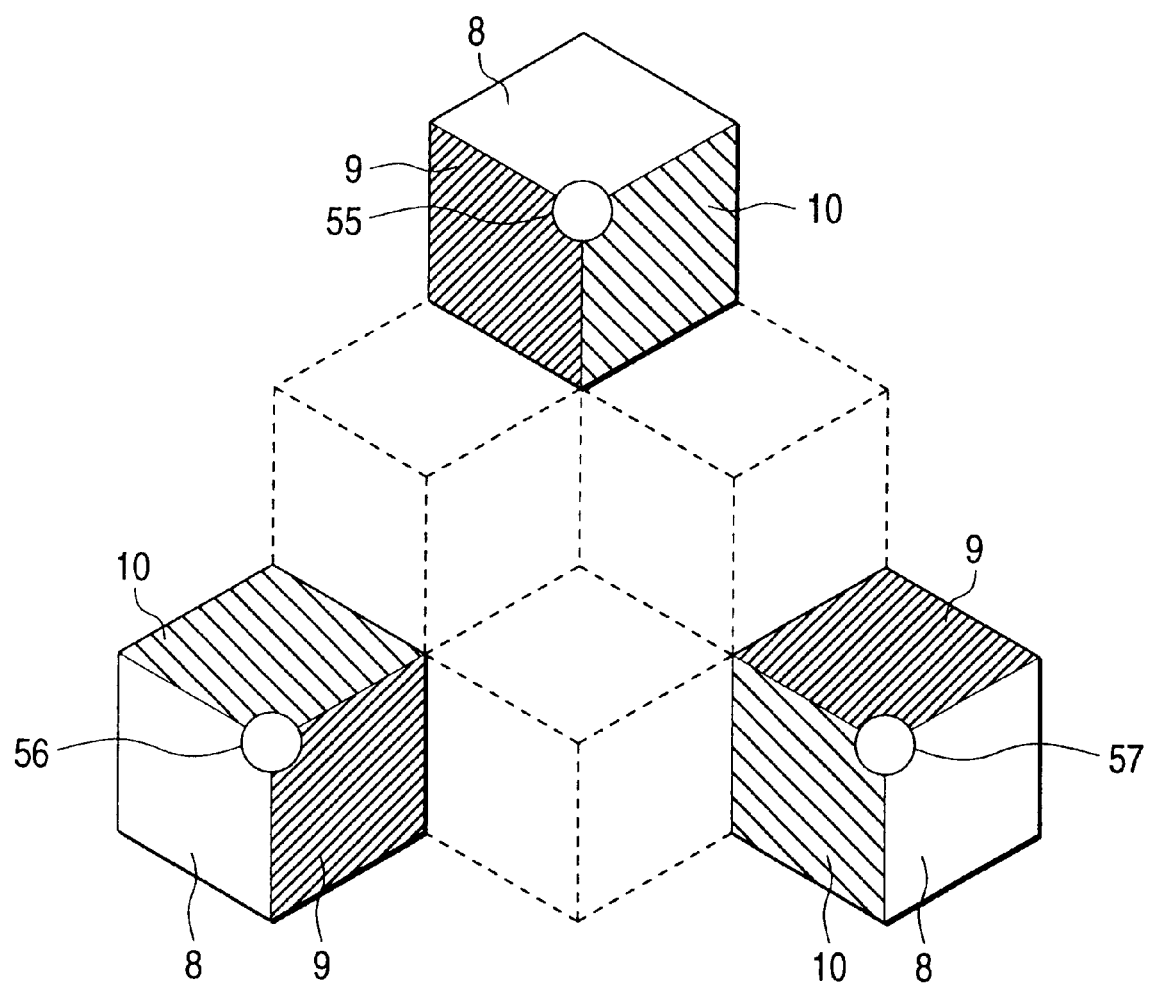
FIG. 15 is a plan view showing a relationship between antenna beams and frequencies assigned to adjacent sites which are situated while is interposed between them a cell having a site whose antenna is assigned different frequency, in the radio communications system according to the seventh embodiment.

FIG. 14 shows the minimum area to be repeated in a cell configuration shown in FIG. 15, wherein cell groups having sixteen different frequencies are arranged in a repeating pattern. In the drawing, reference numerals 1G to 1I, 2G to 2I, . . . , and 16G to 16I designate cells; and 54 designates a minimum unit area to be repeated. Reference numerals 1G to 1I designate cells that constitute the cell group shown in FIG. 15 and are assigned a set of frequencies. In the drawings, the group of cells 1G to 1I, the group of cells 2G to 2I, . . . , and the group of cells 16G to 16I are equal in structure to cells shown in FIG. 15, and each of the cell groups is assigned a set of frequencies. The group of cells 1G to 1I, the group of cells 2G to 2I, . . . , and the group of cells 16G to 16I differ from one another in frequency. In the drawings, the cells 1G to 1I are equal in structure to cells shown in FIG. 15 and are assigned a set of frequencies. Each of the cells is assigned frequencies in the same sequence. The orientations of the beams emanated from antennas of the sites are horizontally offset from one site to another site by 120 degrees. The group of cells 1G to 1I, the group of cells 2G to 2I, . . . , and the group of cells 16G to 16I differ from one another in frequency, thereby constituting the minimum unit area to be repeated while diminishing interference among the cells within the unit area by means of directionality of the antennas disposed at the site or fixed terminal station.

FIG. 15 shows a cell group comprising three cells which are assigned a set of frequencies, and each of the cells is equal in structure to that shown in FIG. 3. In each of the cells, the site has three antennas assigned different frequencies. The three cells are arranged such that a cell having a site equipped with antennas of different frequencies is interposed between adjacent cells. Each of the three sites of the cells is assigned three frequencies in the same sequence. The centers of beams emanated from the antennas assigned the same frequency are set so as to become horizontally offset from one another by 120 degrees. In the drawing, reference numerals 8 to 10 designate service areas of the antennas assigned different frequencies, wherein areas allotted the same reference numeral are assigned the same frequency. Further, reference numerals 55 to 57 designate sites.

Figure 16:
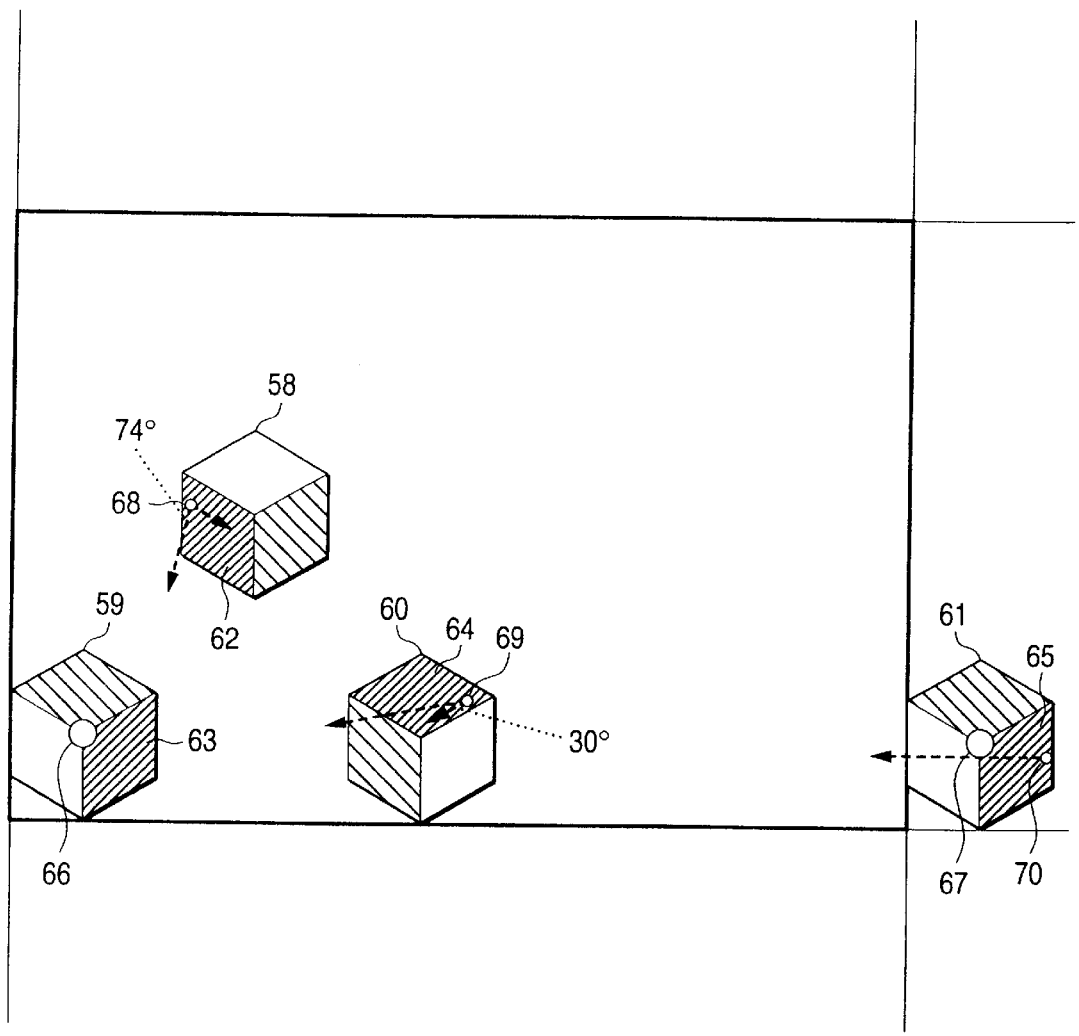
FIG. 16 is a plan view showing interference among radio wave signals according to the seventh embodiment.

FIG. 16 is a schematic representation, wherein attention is directed solely to a cell group including the cells 1G to 1I within the minimum area to be repeated shown in FIG. 14. FIG. 16 shows interference between a site and fixed terminals within the service areas. In the drawing, reference numerals 58 to 61 designate cells; 62 to 65 designate service areas assigned the same frequency; 66 and 67 designate sites; 68 designates a fixed terminal station disposed in the area 62 within the cell 58; 69 designates a fixed terminal station disposed in the area 64 within the cell 60; and 70 designates a fixed terminal station disposed in the area 65 within the cell 61. The areas 62, 63, and 64 are assigned the same frequency. The site 66 disposed in the cell 59 receives interference wave signals from the fixed terminal station 68 located in the cell 58, the fixed terminal station 69 located in the cell 60, and a fixed terminal station 70 located in the cell 61. The C/I ratio of the interference wave signal received from the fixed terminal station 68 is considered to be significantly diminished by means of the directionality of the antenna of the site 66. Provided that an attenuation in the interference wave signal from the fixed terminal station 69 caused by the directionality of the antenna of the site 66 is 25 dB from FIG. 27, a transmission loss inversely proportional to the square of a distance between the site 66 and the fixed terminal station 69 is 10.8 dB. Therefore, the C/I ratio of the interference wave signal received from the fixed terminal station 69 is 35.8 dB (i.e., the sum of 25 dB and 10.8 dB). An attenuation in the interference wave signal from the fixed terminal station 70 caused by the directionality of the antenna of the site 66 is 0 dB, and a transmission loss inversely proportional to the square of the distance between the site 66 and the fixed terminal station 70 is 20.3 dB. Therefore, the C/I ratio of the interference wave signal received from the fixed terminal station 70 is 20.3 dB (i.e., the sum of 0 dB and 20.3 dB). The overall C/I ratio of the interference wave signals received by the site 66 is 20.2 dB. In contrast, the C/I ratio of the interference wave signal received by the site from the fixed terminal stations in the conventional cell configuration shown in FIG. 29 assumes a value of 10.5 dB. The conventional cell configurations shown in FIGS. 27 and 28 require frequencies corresponding to traffic of seven cells. As shown in FIG. 25, the conventional cell configurations can ensure only the C/I ratios of 7.7 dB and 9.1 dB. In contrast, the frequencies assigned to the cell configuration shown in FIG. 14 correspond to traffic of eight cells of a conventional cell configuration. Accordingly, as shown in FIG. 25, the radio system according to the present invention prevents the site or fixed terminal station from experiencing interference, which would otherwise be caused by an interference wave signal, while using frequencies substantially equal in number to those used in the conventional radio system, thereby enabling effective utilization of frequencies.

Eighth Embodiment

Figure 17:
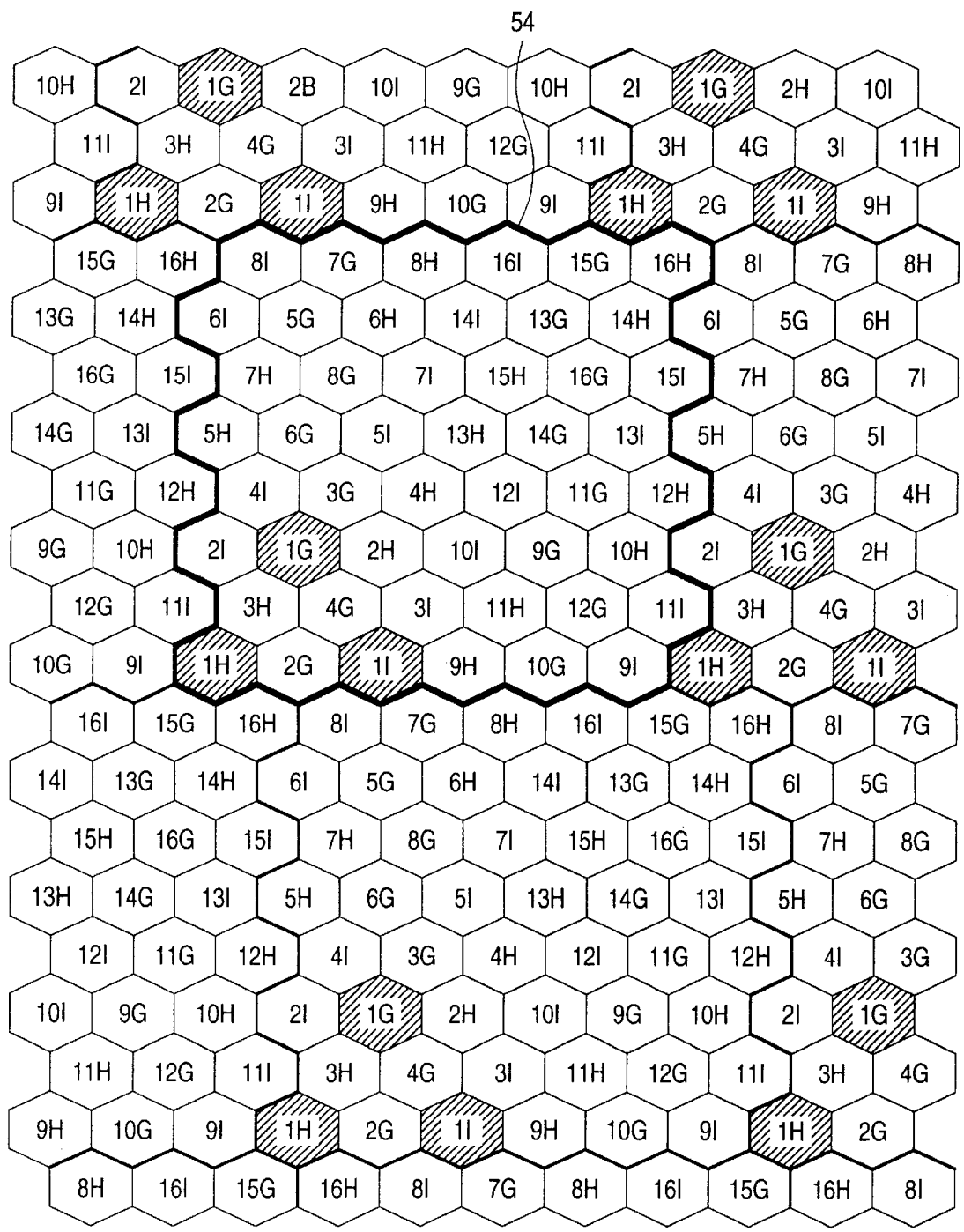
FIG. 17 is a plan view showing the minimum unit areas to be repeated according to an eighth embodiment of the present invention.

FIG. 17 is a plan view showing a cell configuration according to an eighth embodiment of the present invention.

In the drawing, reference numerals 1G to 1I designate cells that constitute the cell group shown in FIG. 15 and are assigned a set of frequencies. Reference numeral 54 designates a minimum unit area to be repeated. In the drawing, the cells 1G to 1I are the same as the cells shown in FIG. 15 and are assigned a set of frequencies. The group of cells 1G to 1I, the group of cells 2G to 2I, . . . , and the group of cells 16G to 16I differ from one another in frequency. FIG. 17 is similar to FIG. 14, showing the layout of minimum unit areas to be repeated. The difference between the drawings is that in FIG. 17 minimum unit areas are repeatedly arranged in the vertical direction so as to become horizontally offset from one another.

Ninth Embodiment

Figure 18:
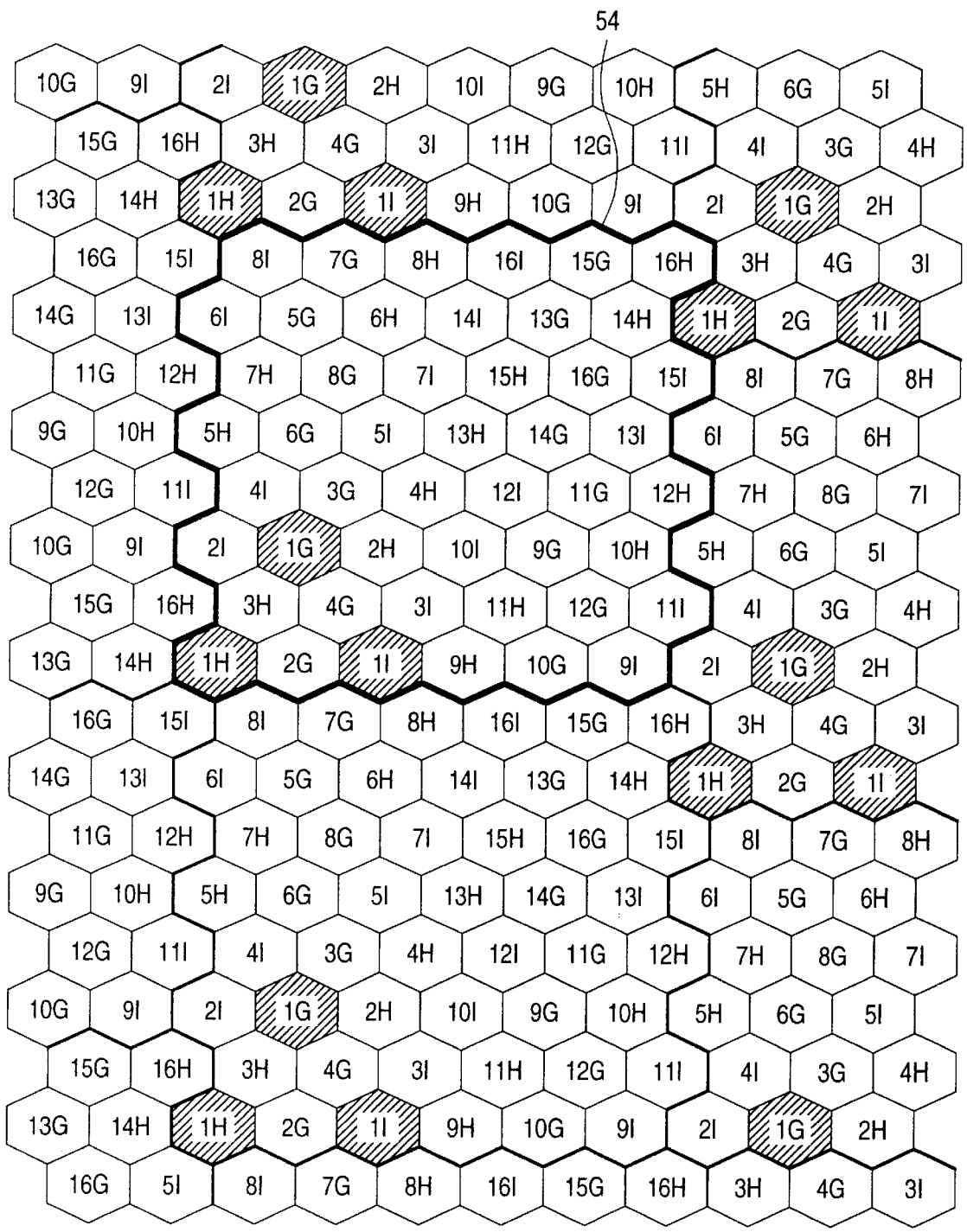
FIG. 18 is a plan view showing the minimum unit areas to be repeated according to a ninth embodiment of the present invention.

FIG. 18 is a plan view showing a cell configuration according to a ninth embodiment of the present invention. In the drawing, reference numerals IG to 1I designate cells that constitute the cell group shown in FIG. 15 and are assigned a set of frequencies. Reference numeral 54 designates a minimum unit area to be repeated. In the drawing, the cells 1G to 1I are the same as the cells shown in FIG. 15 and assigned a set of frequencies. The group of cells 1G to 1I, the group of cells 2G to 2I, . . . , and the group of cells 16G to 16I differ from one another in frequency. FIG. 18 is similar to FIG. 14, showing the layout of minimum unit areas to be repeated. The difference between the drawings is that in FIG. 18 the minimum unit areas 54 are repeatedly arranged such that a column of minimum unit areas becomes vertically offset from another column of minimum unit areas.

Tenth Embodiment

Figure 19:
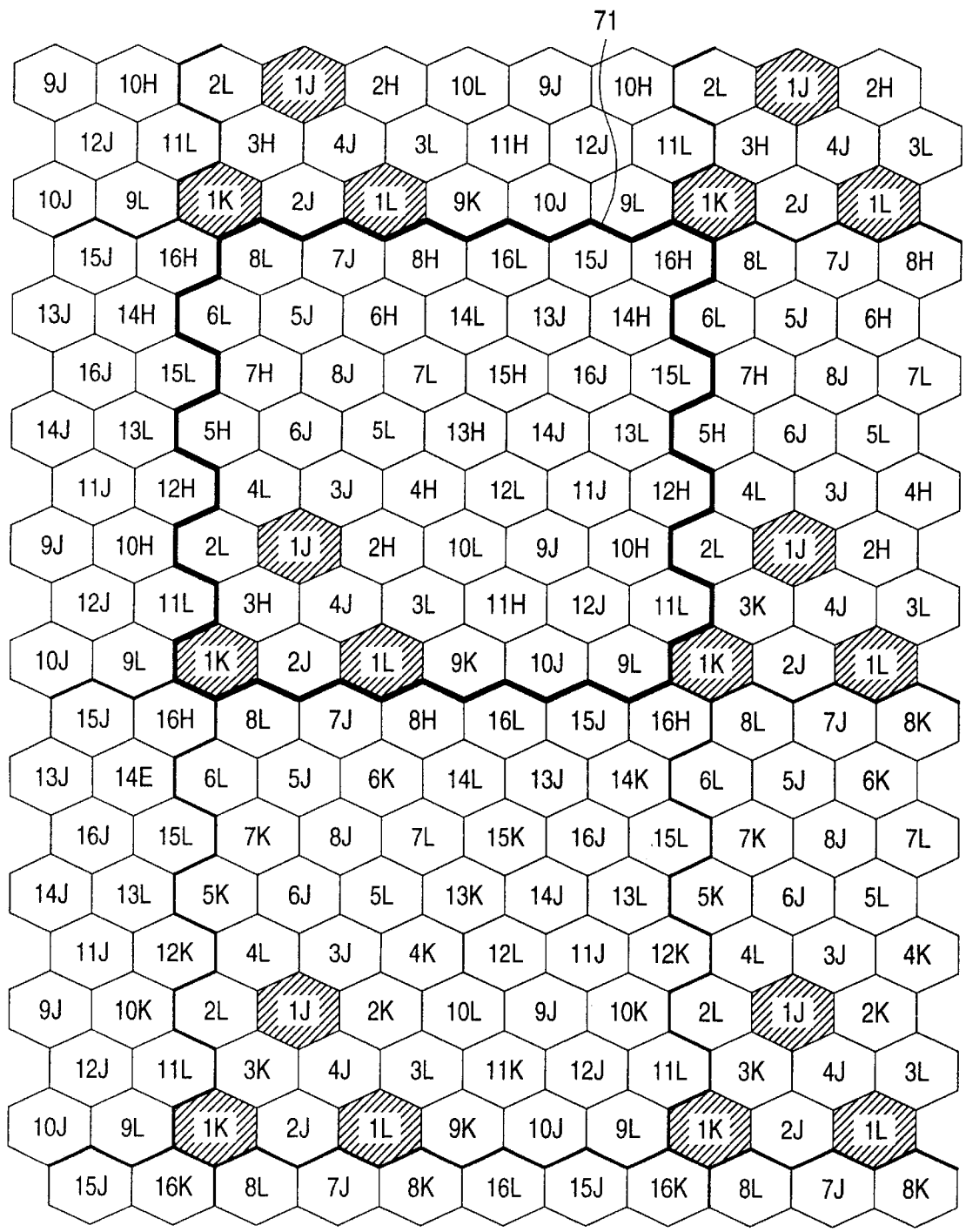
FIG. 19 is a plan view showing the minimum unit areas to be repeated according to a tenth embodiment of the present invention.
Figure 20:
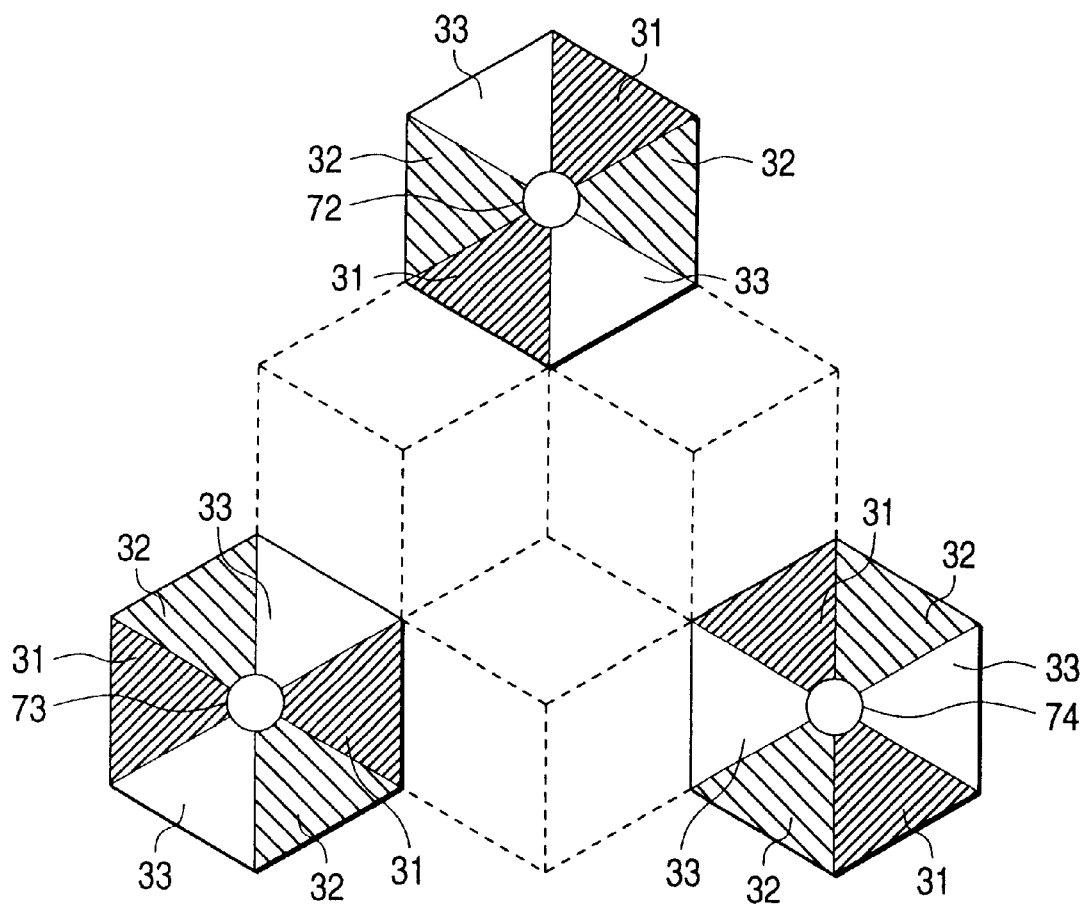
FIG. 20 is a plan view showing a relationship between antenna beams and frequencies assigned to adjacent sites which are situated while is interposed between them a cell having a site whose antenna is assigned different frequency, in the radio communications system according to the tenth embodiment.

FIG. 19 shows the minimum area to be repeated in a cell configuration shown in FIG. 20, wherein cell groups having sixteen different frequencies are arranged in a repeating pattern. Reference numerals 1J to 1L designate cells that constitute the cell group shown in FIG. 20 and are assigned a set of frequencies. Reference numeral 71 designates a minimum repeated area. In the drawings, the cells 1J to 1L are equal in structure to cells shown in FIG. 20 and are assigned a set of frequencies. The group of cells 1J to 1L, the group of cells 2J to 2L, . . . , and the group of cells 16J to 16L differ from one another in frequency. In the drawings, the cells 1J to 1L are equal in structure to cells shown in FIG. 20 and are assigned a set of frequencies. Each of the cells is assigned a set of frequencies in the same sequence. The orientations of the beams emanated from antennas of the sites are horizontally offset from one site to another site by 60 degrees. The group of cells 1J to 1L, the group of cells 2J to 2L, . . . , and the group of cells 16J to 16L differ from one another in frequency, thereby constituting the minimum unit area to be repeated while diminishing interference among the cells within the unit area.

FIG. 20 shows a cell group comprising three cells which are assigned a set of frequencies, and each of the cells is equal in structure to that shown in FIG. 9. In each of the cells the site has three antennas assigned different frequencies. The three cells are arranged such that a cell having a site equipped with antennas of different frequencies is interposed between the adjacent cells. Each of the three sites of the cells is assigned three frequencies in the same sequence. The centers of beams emanated from the antennas assigned the same frequency are set so as to become horizontally offset from one another by 60 degrees. In the drawing, reference numerals 31 to 33 designate service areas of the antennas assigned different frequencies, wherein areas allotted the same reference numeral are assigned the same frequency. Further, reference numerals 72 to 74 designate sites.

Figure 21:
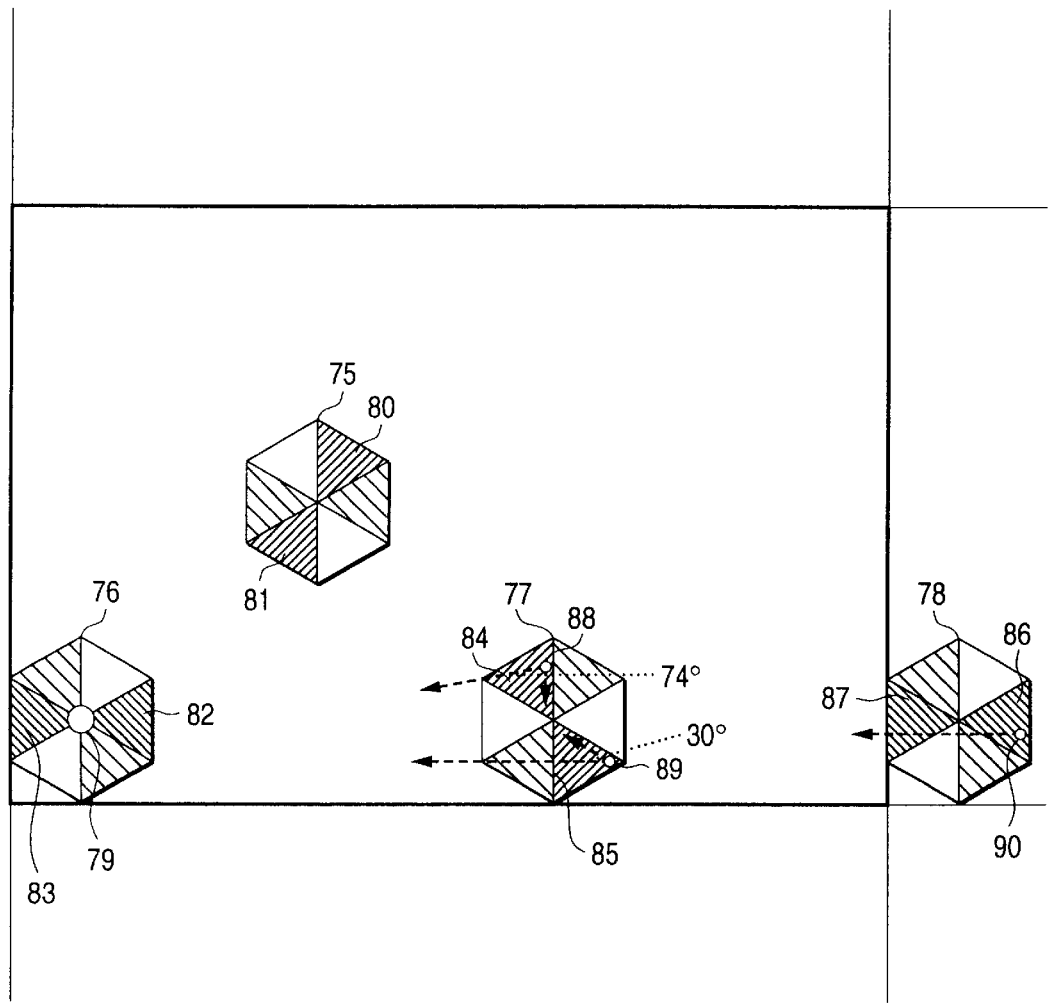
FIG. 21 is a plan view showing interference among radio wave signals according to the tenth embodiment.

FIG. 21 is a schematic representation, wherein attention is directed solely to a cell group including the cells 1J to 1L within the minimum area to be repeated shown in FIG. 19. FIG. 21 shows interference between a site and fixed terminals within the service areas. In the drawing, reference numerals 75 to 78 designate cells; 79 designates a site; 80 to 87 designate service areas assigned the same frequency; 88 designates a fixed terminal station disposed in the area 84 within the cell 77; 89 designates a fixed terminal station disposed in the area 85 within the cell 77; and 90 designates a fixed terminal station disposed in the area 86 within he cell 78. The areas 84, 85, and 86 are assigned the same frequency. The site 79 disposed in the cell 76 receives interference wave signals from the fixed terminal stations 88 and 89 located in the cell 77 and the fixed terminal station 90 located in the cell 78. The C/I ratio of each of the interference wave signals is considered to be the same as that mentioned previously. Provided that an attenuation in the interference wave signal from the fixed terminal station 88 caused by the directionality of the antenna of the site 79 is taken as 27 dB from FIG. 27, a transmission loss inversely proportional to the square of the distance between the site 79 and the fixed terminal station 88 is 12.3 dB. Therefore, the C/I ratio of the interference wave signal received from the fixed terminal station 88 is 39.3 dB (i.e., the sum of 27 dB and 12.3 dB). Similarly, the C/I ratio of the interference wave signal from the fixed terminal station 89 is 35.8 dB, and the C/I ratio of the interference wave signal from the fixed terminal station 90 is 20.3 dB. An overall C/I ratio of the interference wave signals received by the site 79 is 20.1 dB. In contrast, the C/I ratio of the interference wave signal received by the fixed terminal from the sites in the conventional cell configuration shown in FIG. 29 assumes a value of 9.5 dB. The conventional cell configurations shown in FIGS. 27 and 28 require frequencies corresponding to traffic of seven cells of a conventional cell configuration. As shown in FIG. 26, the conventional cell configurations can ensure only the C/I ratios of 10.5 dB and 11.0 dB. In contrast, the frequencies assigned to the cell configuration shown in FIG. 19 correspond to traffic of eight cells of a conventional cell configuration. Accordingly, as shown in FIG. 26, the radio system according to the present invention prevents a site or a fixed terminal station from experiencing interference, which would otherwise be caused by an interference wave signal, while using frequencies substantially equal in number to those used in the conventional radio system, thereby enabling effective utilization of frequencies.

Eleventh Embodiment

Figure 22:
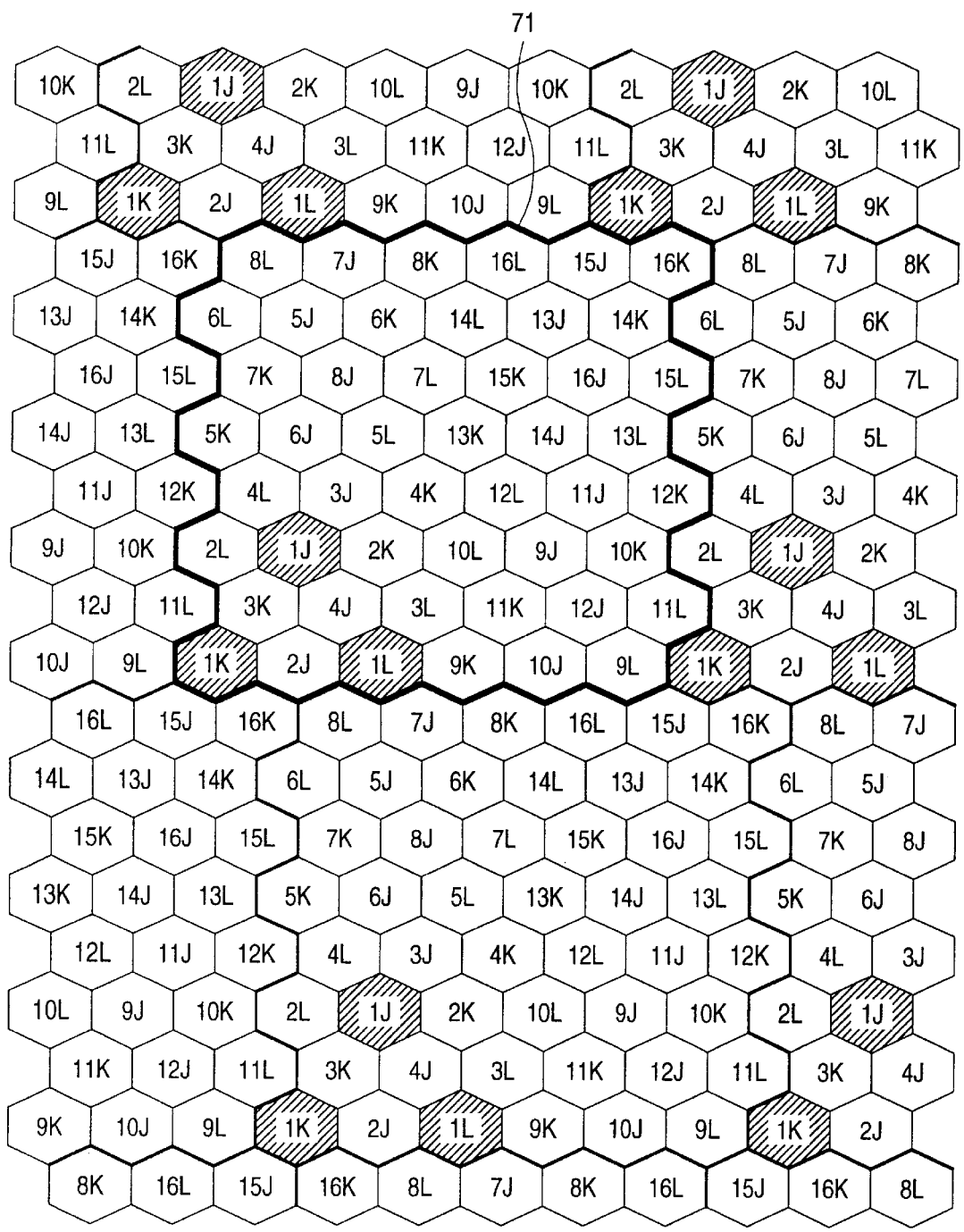
FIG. 22 is a plan view showing the minimum unit areas to be repeated according to an eleventh embodiment of the present invention.

FIG. 22 is a plan view showing a cell configuration according to an eleventh embodiment of the present invention. In the drawing, reference numerals 1J to 1L designate cells that constitute the cell group shown in FIG. 20 and are assigned a set of frequencies. Reference numeral 71 designates a minimum unit area to be repeated. In the drawing, the cells 1J to 1L are the same as the cells shown in FIG. 20 and are assigned a set of frequencies. The group of cells 1J to 1L, the group of cells 2J to 2L, . . . , and the group of cells 16J to 16L differ from one another in frequency. FIG. 22 is similar to FIG. 19, showing the layout of minimum unit areas to be repeated. The difference between the drawings is that in FIG. 22 minimum unit areas are repeatedly arranged in the vertical direction so as to become horizontally offset from one another.

Twelfth Embodiment

Figure 23:
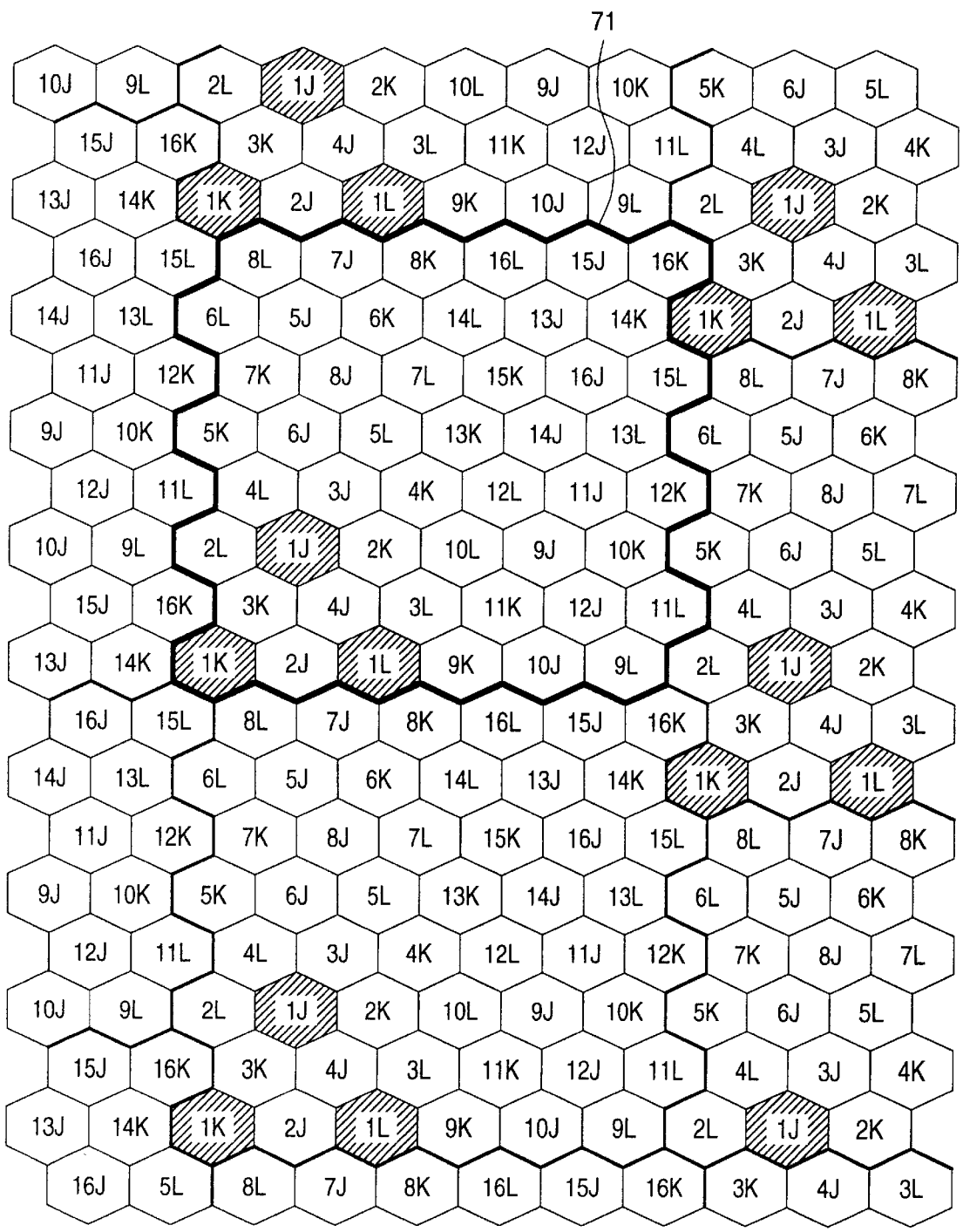
FIG. 23 is a plan view showing the minimum unit areas to be repeated according to a twelfth embodiment of the present invention.

FIG. 23 is a plan view showing a cell configuration according to a twelfth embodiment of the present invention.

FIG. 23 is similar to FIG. 19, showing the layout of minimum unit areas to be repealed. The difference between the drawings is that in FIG. 23 minimum unit areas are repeatedly arranged such that a column of minimum unit areas becomes vertically offset from another column of minimum unit areas.

In the previous embodiments, repetition of the number of antennas and frequencies have been described with reference to examples. Clearly, there may be employed a plurality of combinations other than the examples mentioned previously. However, in practice, there may arise some variations in the shape of cells as well as in the positions of sites disposed at the respective centers of the cells. Obviously, the present invention can also be applied to such a case. Receipt of radio signals by the site has been described in terms of explanation of interference among radio wave signals. The difference between the case where the site receives radio wave signals from fixed terminal stations and the case where the fixed terminal station receives radio wave signals from sites is that radio wave signals are transmitted in opposite direction. Therefore, there is no need to provide a special explanation for the case where the fixed terminal station receives radio wave signals from sites.

According to a first aspect of the present invention, there is provided a radio communications system which establishes radio communication between arbitrary sites and fixed terminal stations which are directional and disposed in a cell centered on the site, wherein each of the sites is provided with three antennas of equal horizontal beam width and whose orientations are horizontally offset from one another; at each site, the beams emanated from the individual antennas, as a whole, cover all horizontal directions; the antennas assigned the same frequency as that of the site are arranged in the same sequence; a cell group comprises three cells, in which the centers of beams emanated from the antennas assigned the same frequency are offset from one site to another site by an amount approximately equal to the beam width; the cells are adjacent to one another; the cell group comprises a plurality of groups of different frequencies and constitutes a minimum unit area to be repeated; and the minimum unit areas are repeatedly arranged in longitudinal and lateral directions.

A conventional sector cell configuration requires frequencies corresponding to traffic of seven cells. In contrast, the sector cell configuration according to the present invention requires the frequencies corresponding to traffic of eight cells of a conventional cell configuration. Accordingly, the radio system according to the present invention prevents a site or a fixed terminal station from experiencing interference, which would otherwise be caused by an interference wave signal, while using frequencies substantially equal in number to those used in the conventional radio system, thereby enabling effective utilization of frequencies.

According to a second aspect of the present invention, there is provided a radio communications system which establishes radio communication between arbitrary sites and fixed terminal stations which are directional and disposed In a cell centered on the site, wherein each of the sites is provided with "n" (where "n" represents a positive integer equal to or greater than 4) sector antennas which are equal in horizontal beam width and whose orientations are horizontally offset from one another; at each site the beams emanated from the individual antennas, as a whole, cover all horizontal directions; frequencies are arranged such that sectors within a cell are assigned the same frequency every "m" sectors (where "m" represents a positive integer of equal to or greater than 2, and m<n); the antennas assigned the same frequency as that of the site are arranged in the same sequence; a cell group comprises "m" cells, in which the centers of beams emanated from the antennas assigned the same frequency are horizontally offset from one site to another site by an amount approximately equal to the beam width; the cells are adjacent to one another; the cell group comprises a plurality of groups of different frequencies and constitutes a minimum unit area to be repeated; and the minimum unit areas are repeatedly arranged in longitudinal and lateral directions. A conventional sector cell configuration requires frequencies corresponding to traffic of seven cells. In contrast, the sector cell configuration according to the present invention requires the frequencies corresponding to traffic intensity of eight cells of a conventional configuration. Accordingly, the radio system according to the present invention prevents the site or fixed terminal station from experiencing interference, which would otherwise be caused by an interference wave signal, while using frequencies substantially equal in number to those used in the conventional radio system, thereby enabling effective utilization of frequencies.

According to a third aspect of the present invention, there is provided a radio communications system which establishes radio communication between arbitrary sites and fixed terminal stations which are directional and disposed in a cell centered on the site, wherein each of the sites is provided with three antennas which are equal in horizontal beam width and whose orientations are horizontally offset from one another; at each site, the beams emanated from the individual antennas, as a whole, cover all horizontal directions; the antennas assigned the same frequency as that of the site are arranged in the same sequence; a cell group comprises three cells, in which the centers of beams emanated from the antennas assigned the same frequency are offset from one site to another site by an amount approximately equal to the beam width; the cells are arranged such that a cell having an antenna assigned different frequency is interposed between adjacent cells; the cell group comprises a plurality of groups of cells assigned different frequencies and constitutes a minimum unit area to be repeated; and the minimum unit areas are repeatedly arranged in longitudinal and lateral directions.

A conventional sector cell configuration requires frequencies corresponding to traffic of seven cells. In contrast, the sector cell configuration according to the present invention requires the frequencies corresponding to traffic of eight cells of a conventional cell configuration. Accordingly, the radio system according to the present invention prevents a site or a fixed terminal station from experiencing interference, which would otherwise be caused by an interference wave signal, while using frequencies substantially equal in number to those used in the conventional radio system, thereby enabling effective utilization of frequencies.

According to a fourth aspect of the present invention, there is provided a radio communications system which establishes radio communication between arbitrary sites and fixed terminal stations which are directional and disposed in a cell centered on each site, wherein each of the sites is provided with "n" (where "P" represents a positive integer equal to or greater than 4) sector antennas which are equal in horizontal beam width and whose orientations are horizontally offset from one another; the beams emanated from the individual antennas, as a whole, cover all horizontal directions; frequencies are arranged such that sectors within a cell are assigned the same frequency every "m" sectors (where "m" represents a positive integer of equal to or greater than 2, and m<n); the antennas assigned the same frequency as that of the site are arranged in the same sequence; a cell group comprises "m" cells, in which the centers of beams emanated from the antennas assigned the same frequency are offset from one site to another site by an amount approximately equal to the beam width; the cells are arranged such that "L" (where "L" designates 0 or a positive integer greater than 1) cells having an antenna assigned a different frequency is interposed between the adjacent cells; the cell group comprises a plurality of groups of different frequencies and constitutes a minimum unit area to be repeated; and the minimum unit areas are repeatedly arranged in longitudinal and lateral directions.

A conventional sector cell configuration requires frequencies corresponding to traffic of seven cells. In contrast, the sector cell configuration according to the present invention requires the frequencies corresponding to traffic intensity of eight cells of a conventional cell configuration. Accordingly, the radio system according to the present invention prevents a site or a fixed terminal station from experiencing interference, which would otherwise be caused by an interference wave signal, while using frequencies substantially equal in number to those used in the conventional radio system, thereby enabling effective utilization of frequencies.

According to a fifth aspect of the present invention, the minimum unit areas are repeatedly arranged in the vertical direction so as to become horizontally offset from one another. Accordingly, the radio system for offering communication services to a plurality of fixed terminal stations according to the present invention prevents a site or a fixed terminal station from experiencing interference, which would otherwise be caused by an interference wave signal, while using frequencies substantially equal in number to those used in the conventional radio system, thereby enabling effective utilization of frequencies.

According to a sixth aspect of the present invention, the minimum unit areas are repeatedly arranged such that a column of minimum unit areas becomes vertically offset from another column of minimum unit areas. Accordingly, the radio system for offering communication services to a plurality of fixed terminal stations according to the present invention prevents the site or fixed terminal station from experiencing interference, which would otherwise be caused by an interference wave signal, while using frequencies substantially equal in number to those used in the conventional radio system, thereby enabling effective utilization of frequencies.

What is claimed is:

1. A radio communications system for establishing radio communication between arbitrary sites and fixed terminal stations, each of the fixed terminal stations being directional and disposed in a cell centered on a respective one of the arbitrary sites, wherein each of the sites is provided with three antennas of equal horizontal beam width and whose orientations are horizontally offset from one another;

beams emanated from the three antennas taken together cover all horizontal directions;

corresponding ones of the antennas assigned the same frequency as that of the site are arranged in the same sequence; the radio communications system further comprising:

a cell group comprising three cells centered on three respective sites, in which the centers of beams emanated from ones of the respective three antennas associated with each of the three sites, which ones are assigned the same frequency are offset from one site to another site by an amount approximately equal to a beam width; wherein the three cells are adjacent to one another;

the cell group, further comprises a plurality of groups of different frequencies and constitutes a minimum unit area to be repeated; and the minimum unit areas are repeatedly arranged in longitudinal and lateral directions.

2. The radio communications system as defined in claim 1, wherein the minimum unit area is repeatedly arranged in the vertical direction so as to become horizontally offset from one another.

3. The radio communications system as defined in claim 1, wherein the, minimum unit area is repeatedly, arranged such that a column of minimum unit areas becomes vertically offset from another column of minimum unit areas.

4. A radio communications system for establishing radio communication between arbitrary sites and fixed terminal stations, each of the fixed terminal stations being directional and disposed in a cell centered on a respective one of the arbitrary sites, wherein each of the sites is provided with "n" sector antennas wherein each of the "n" sector antennas has equal horizontal beam width and wherein orientations associated with the each are horizontally offset from one another, wherein "n" represents a positive integer equal to or greater than 4;

beams emanated from the "n" sector antennas taken together cover all horizontal directions;

frequencies are arranged such that ones of the "n" sectors within a cell associated with the each of the sites are assigned the same frequency every "m" sectors where "m" represents a positive integer of equal to or greater than 2, and m<n;

corresponding ones of the antennas assigned the same frequency as that of the site are arranged in the same sequence; the radio communications system further comprising:

a cell group constituting a minimum unit area to be repeated, the cell group comprising "m" adjacent cells each assigned a group of frequencies, wherein centers of beams emanated from the corresponding ones of the "n" sector antennas assigned the same frequency are horizontally offset from one site to another site by an amount approximately equal to one beam width;

wherein the minimum unit area is repeatedly arranged in longitudinal and lateral directions.

5. The radio communications system as defined in claim 4, wherein the minimum unit area is repeatedly arranged in the vertical direction so as to become horizontally offset from one another.

6. The radio communications system as defined in claim 4, wherein the minimum unit area is repeatedly arranged such that a column of minimum unit areas becomes vertically offset from another column of minimum unit areas.

7. A radio communications system for establishing radio communication between arbitrary sites and fixed terminal stations, each of the fixed terminal stations being directional and disposed in a cell centered on a respective one of the arbitrary sites, wherein each of the sites is provided with three antennas which are equal in horizontal beam width and whose orientations are horizontally offset from one another;

beams emanated from the three antennas taken together cover all horizontal directions;

corresponding ones of the antennas assigned the same frequency as that of the site are arranged in the same sequence; the radio communications system further comprising:

a cell group comprising three cells, each of the three cells assigned a group of frequencies, the cell group constituting a minimum area to be repeated, wherein centers of beams emanated from respective ones of the respective three antennas assigned the same frequency are offset from one site to another site by an amount approximately equal to one beam width;

wherein the three cells are further arranged such than an additional cell assigned different frequencies from any of the groups of frequencies is interposed between proximate cells; and wherein the minimum unit area is repeatedly arranged in longitudinal and lateral directions.

8. The radio communications system as defined in claim 7, wherein the minimum unit area is repeatedly arranged in the vertical direction so as to become horizontally offset from one another.

9. The radio communications system as defined in claim 7, wherein the minimum unit area is repeatedly arranged such that a column of minimum unit areas becomes vertically offset from another column of minimum unit areas.

10. A radio communications system for establishing radio communication between arbitrary sites and fixed terminal stations, each of the fixed terminal stations being directional and disposed in a cell centered on a respective one of the arbitrary sites, wherein each of the sites is provided with "n" sector antennas wherein each of the "n" sector antennas has equal horizontal beam width and wherein orientations associated with the each are horizontally offset from one another, wherein "n" represents a positive integer equal to or greater than 4;

beams emanated from the "n" sector antennas taken together cover all horizontal directions;

frequencies are arranged such that ones of the "n" sectors within a cell are assigned the same frequency every "m" sectors where "m" represents a positive integer of equal to or greater than 2, and m<n;

corresponding ones of the antennas assigned the same frequency as that of the site are arranged in the same sequence;

a cell group constituting a minimum unit area to be repeated, the cell group comprising "m" adjacent cells each assigned a group of different frequencies, wherein centers of beams emanated from the corresponding ones of the "n" sector antennas assigned the same frequency are horizontally offset from one site to another site by an amount approximately equal to one beam width;

the "m" adjacent cells associated with the cell group are further arranged such that "L" additional each assigned different frequencies from any of the group of different frequencies are interposed between the "m" proximate cells, where "L" designates 0 or a positive integer greater than 1;

wherein the minimum unit area is repeatedly arranged in longitudinal and lateral directions.

11. The radio communications system as defined in claim 10, wherein the minimum unit area is repeatedly arranged in the vertical direction so as to become horizontally offset from one another.

12. The radio communications system as defined in claim 10, wherein the minimum unit area is repeatedly arranged such that a column of minimum unit areas becomes vertically offset from another column of minimum unit areas.

13. A radio communications system for establishing radio communication comprising:

one or more cell groups each having at least three adjacent cells; wherein each of the adjacent cells has at least "n" antennas with equal horizontal beam width, the "n" antennas associated with corresponding "n" cell sectors, the "n≦" antennas directed approximately (360/"n")degrees apart from each other in a horizontal plane;

wherein each of three adjacent cells in the one or more cell groups are assigned a plurality of frequencies;

wherein corresponding ones of the "n" antennas are assigned the same frequency every "m" of the "n" corresponding cell sectors and wherein the corresponding ones of the "n" antennas assigned the same frequency in each of the three adjacent cells are further arranged in the same sequence; and wherein one or more cell groups constitutes a minimum unit area to be repeated over a geographical area associated with the radio communications system; and wherein a plurality of minimum unit areas are repeatedly arranged in longitudinal and lateral directions.

14. The radio communications system of claim 13, wherein the corresponding ones of the "n" antennas assigned the same frequency in each of the three adjacent cells are further offset by at least an amount approximately equal to (360/"n")degrees from one of the three adjacent cells to the next.

15. The radio communications system of claim 13, wherein the adjacent cells are further arranged such that one or more additional cells each assigned a different plurality of frequencies are interposed between ones of the three adjacent cells.

16. The radio communications system of claim 13, where "n" is a positive integer equal to or greater than 3, "m" is a positive integer equal to or greater than 2, and where "m"<"n".

17. A method for establishing radio communication comprising:

arranging one or more cell groups each having at least three adjacent cells; wherein each of the adjacent cells has at least "n" antennas with equal horizontal beam width, the "n" antennas associated with corresponding "n" cell sectors, the "n" antennas directed approximately (360/"n")degrees apart from each other in a horizontal plane;

assigning a plurality of frequencies to each of three adjacent cells in the one or more cell groups; and assigning corresponding ones of the "n" antennas the same frequency every "m" of the "n" corresponding cell sectors, wherein the corresponding ones of the "n" antennas assigned the same frequency in each of the three adjacent cells are further arranged in the same sequence;

wherein one or more cell groups constitutes a minimum unit area to be repeated over a geographical area associated with the radio communications system; and wherein a plurality of minimum unit areas are repeatedly arranged in longitudinal and lateral directions.

18. The method of claim 17, wherein the step of assigning further comprises:

assigning corresponding ones of the "n" antennas the same frequency every "m" of the "n" corresponding cell sectors and offsetting the corresponding ones of the "n" antennas assigned the same frequency in each of the three adjacent cells by at least an amount approximately equal to (360/"n")degrees from one of the three adjacent cells to the next.

19. The method of claim 17, wherein the three adjacent cells are further arranged such that one or more additional cells each assigned a different plurality of frequencies are interposed between ones of the three adjacent cells.

20. The method of claim 18, wherein "n" is a positive integer equal to or greater than 3, "m" is a positive integer equal to or greater than 2, and where "m"<"n".

* * * * *

UNITED STATES PATENT AND TRADEMARK OFFICE
CERTIFICATE OF CORRECTION

PATENT NO. : 6,615,047 B1
DATED : September 2, 2003
INVENTOR(S) : Kousuke Yasooka et al.

It is certified that error appears in the above-identified patent and that said Letters Patent is hereby corrected as shown below:

Title page,
Please add the Foreign Priority information as follows:

-- [30]    Foreign Application Priority Data

April 9, 1998    (JP) ........................ 10-97728 --

Signed and Sealed this

Twenty-second Day of June, 2004

JON W. DUDAS
*Acting Director of the United States Patent and Trademark Office*